United States Patent
Isowaki et al.

(10) Patent No.: US 6,417,854 B1
(45) Date of Patent: Jul. 9, 2002

(54) IMAGE PROCESSING SYSTEM

(75) Inventors: Takashi Isowaki, Honolulu, HI (US); Junichi Yamanaka, Tokyo (JP); Hiroshi Masui, Tokyo (JP); Takashi Fujimura, Tokyo (JP); Takeshi Iwasaki, Tokyo (JP); Naotake Nishimura, Tokyo (JP); Makoto Osaki, Tokyo (JP); Koki Koiwa, Tokyo (JP); Saori Nishikawa, Tokyo (JP)

(73) Assignee: Kabushiki Kaisha Sega Enterprises, Tokyo (JP)

(*) Notice: Subject to any disclaimer, the term of this patent is extended or adjusted under 35 U.S.C. 154(b) by 0 days.

(21) Appl. No.: 09/196,231

(22) Filed: Nov. 20, 1998

(30) Foreign Application Priority Data

Nov. 21, 1997 (JP) ............................................. 9-321727

(51) Int. Cl.[7] .............................................. G06T 15/70
(52) U.S. Cl. ....................................... 345/473; 345/582
(58) Field of Search ................................. 345/473, 430; 463/6, 34; 434/43

(56) References Cited

U.S. PATENT DOCUMENTS 4,645,459 A * 2/1987 Graf et al. ................... 434/43
5,755,620 A * 5/1998 Yamamoto et al. ........... 463/34

OTHER PUBLICATIONS

Max et al., "Visualization for Climate Modeling", IEEE Computer Graphics & Applications, 1993, pp. 34, 38.*

* cited by examiner

Primary Examiner—Mark Zimmerman
Assistant Examiner—Lance W. Sealey
(74) Attorney, Agent, or Firm—Finnegan, Henderson, Farabow, Garrett & Dunner, L.L.P.

(57) ABSTRACT

The image processing system comprises means for preparing a plurality of textures for providing to at least one first texture thereof a background image, in which a movable object is either in a stationary or low-speed state and means for providing to at least one of the remaining second textures a background image of when a movable object is in a low-speed or faster state of travel and for mapping to a screen in accordance with the state of themovable object the second texture in addition to the first texture.

25 Claims, 24 Drawing Sheets

FIG.27

| DIVISION | ODD BLOCK NUMBER ; EVEN BLOCK NUMBER | AREA NUMBER |
|---|---|---|
| (1) | FIRST BLOCK BLK1 ; SIXTH BLOCK BLK6 | AR1 |
| (2) | FIRST BLOCK BLK1 ; SECOND BLOCK BLK2 | AR2 |
| (3) | FIRST BLOCK BLK3 ; SECOND BLOCK BLK2 | AR3 |
| (4) | FIRST BLOCK BLK3 ; SECOND BLOCK BLK4 | AR4 |
| (5) | FIRST BLOCK BLK5 ; SECOND BLOCK BLK4 | AR5 |
| (6) | FIRST BLOCK BLK5 ; SECOND BLOCK BLK6 | AR6 |

IMAGE PROCESSING SYSTEM

BACKGROUND OF THE INVENTION

1. Field of the Invention

The present invention relates to a video game machine, and more particularly to a video game machine which is installed in an amusement center or home, and which is capable of rendering more realistic images.

2. Description of the Related Art

In line with advances in computer technology, video game machines, which make use of computer graphics technology, have come into widespread use. This type of video game machine has met with wide user acceptance. Also, a multitude of different types of game machines have been contrived in large numbers, and a variety of game software corresponding thereto has been supplied.

To make video games even more enjoyable for the user, it is desirable that images be displayed on a screen with more realistic rendering. For example, in a vehicular race, such as a car race, it is desirable that the movements of the vehicle and background scenery be rendered naturally, and that events that could occur during driving, such as the way a car is damaged in a crash, for example, be rendered realistically.

In the past, there was a polygon of a state, in which a car is damaged by such a crash, and rendering was performed by means thereof. Since damaged states are diverse, it was necessary to store huge numbers of polygons for the rendering thereof. In actuality, this was impossible. Further, when a paucity of polygons are stored, the energy of the car does not coincide with the degree of damage, making it impossible to handle diversified renderings.

Further, similar such things occurred when a vehicle was traveling. For example, there were also irregularities, whereby the movement of the background in accordance with the speed of vehicular travel was not rendered, and the movement of a car during actual travel was not rendered naturally.

Conversely, with a three-dimensional (3D) video display, because coordinate conversions and other complex operations are repeated, the amount of CPU operations becomes enormous. Consequently, when image rendering special effects are performed, the processing time applied to other processes must be reduced by the amount of operations used therefor.

SUMMARY OF THE INVENTION

Accordingly, an first object of the present invention is to provide a game machine which speeds up processing time when diversifying a screen rendering by reducing data transmission time.

Accordingly, another object of the present invention is to provide a game machine which is capable of diversifying a screen rendering by reflecting the state in which a movable object is actually traveling in a background screen.

Further, a further object of the present invention is to provide a game machine which is capable of diversifying a screen rendering so that when a car crashes, the energy of the crash, and results that coincide with the direction of the crash, can be rendered in a screen.

To achieve the above-described objects, an image processing system related to the present invention is an image processing system, which displays in a screen a state, in which a movable object moves, this image processing system being characterized in that it comprises a first storage means, which divides a storage area for providing to a display means a screen of a state, in which a movable object moves, into a common display area and a movement display area; a second storage means, which stores data for rendering a screen of a state, in which a movable object moves by dividing that data in accordance with the divided state of the above-mentioned storage means, and which stores information that indicates the relation between this divided storage data; and means for transferring to a movement display area of the first storage means the data that is divided and stored in the above-mentioned second storage means on the basis of the relation between the above-mentioned divided storage data when a movable object moves.

In another mode of the present invention, the above-mentioned first storage means is a texture memory, and the texture memory is characterized in that it is used by dividing it into a common area, which stores non-rewritable texture data when displaying a state, in which a movable object moves, and an even block area and an odd block area, which are capable of storing two blocks of texture, which accompany the movement of a movable object, such as background scenery, when it is divided into an even block and an odd block, respectively.

In yet another mode of the present invention, the above-mentioned second storage means is a read-only memory device, and the above-mentioned read-only memory device is characterized in that it stores common texture and each block of texture in individual blocks in a state, which accords with the divided state of texture memory.

Furthermore, the invention that is related to another mode is characterized in that one block of the above-mentioned second storage means stores a plurality of sheets of texture, and the above-mentioned transfer means transfers one sheet of texture per frame of the plurality of sheets of texture stored in this one block.

Furthermore, the present invention is an image processing system, which displays in a screen a state, in which a movable object moves, this image processing system being characterized in that it comprises means for providing a plurality of textures; for providing to at least one first texture thereof a background image, in which a movable object is either stationary or in a low-speed state; for providing to at least one of the remaining second textures a background image, in which a movable object is in a traveling state of low speed or faster; and for mapping to the screen in accordance with the state of the movable object the second texture in addition to the first texture.

The present invention related to yet another mode is characterized in that the above-mentioned first texture is a picture, which can display a screen of a road surface when a movable object is in a state of being practically stopped, and a second texture is a picture, which can display a screen of a moving road surface when a movable object is in a traveling state.

Furthermore, the above-mentioned second texture is characterized in that it is a picture, which can display a plurality of screens in accordance with the speed of the traveling state of the movable object.

And furthermore, the present invention is an image processing system, which displays in a screen a state, in which a movable object moves, this image processing system being characterized in that it comprises processing means for enabling the detection of the direction of movement and amount of movement of a movable object, when the movable object crashes, and enables the reflection of the detected amounts thereof in the amount of deformation of the movable object.

Another mode of the present invention is characterized in that it divides the above-mentioned movable object into blocks, and provides from the detected values a block targeted for the above-mentioned image processing. Furthermore, another mode is characterized in that it is designed so as to map a pre-deformation texture and a post-deformation texture for the above-mentioned movable object, and change the blend ratio of both above-mentioned textures in accordance with the quantities detected when the above-mentioned crash occurred. Furthermore, the above-mentioned blend ratio changes the transparency parameter of the above-mentioned texture.

BRIEF DESCRIPTION OF THE DRAWINGS

FIG. 27 is a graph showing the correspondence between a block and an area.

DESCRIPTION OF THE PREFERRED EMBODIMENTS

Firstly, the configuration of a game machine capable of implementing a special effects image algorithm of the present invention is explained with reference to the figures.

Figure 1:
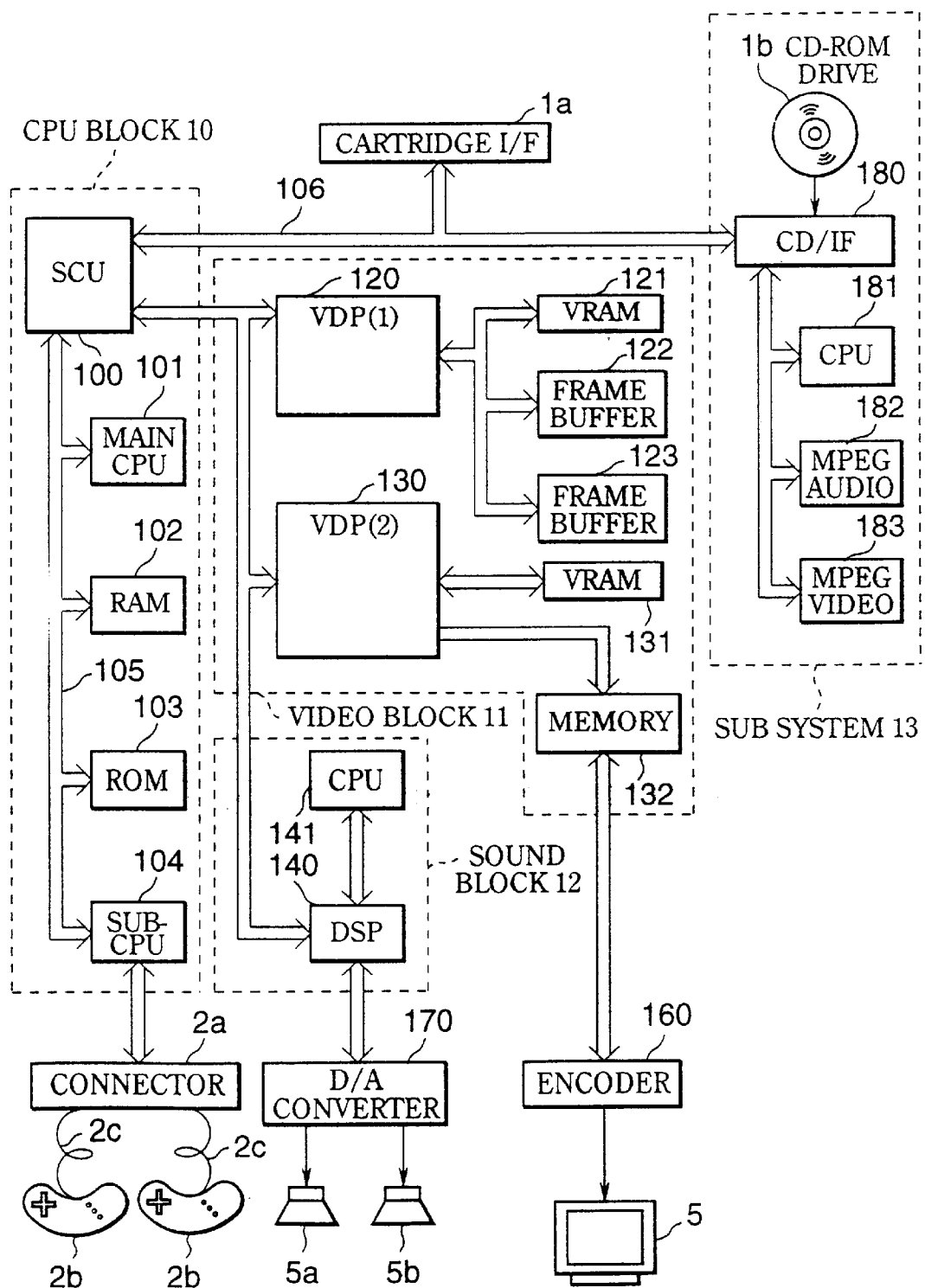
FIG. 1 is a functional block diagram of a game machine of an embodiment related to the present invention.

FIG. 1 is a block diagram depicting an overview of a video game machine. This machine comprises, among other things, a CPU block 10, which controls the entire machine, a video block 11, which displays and controls the game screens, a sound block 12, which generates sound effects and the like, and a subsystem 13, which reads a CD-ROM.

The CPU block 10 comprises such things as an SCU (System Control Unit) 100, a main CPU 101, RAM 102, ROM 103, a cartridge I/F 1a, a sub-CPU 104, and a CPU bus 103. The main CPU 101 controls the overall machine. This main CPU 101 comprises internal computing functions similar to a DSP (Digital Signal Processor), and is capable of high-speed execution of application software.

RAM 102 is utilized as the main CPU 101 work area. ROM 103 stores, among other things, an initial program for initialization processing. The SCU 100 smoothly performs data inputting and outputting between the main CPU 101, a VDP 120, a DSP 140 and a CPU 141 by controlling buses 105, 106, 107. Further, the SCU 100 comprises an internal DMA controller, and is capable of transferring game object (or sprite) data to a VRAM in the video block 11. This enables games and other application software to be executed at high speed. The cartridge I/F 1a is for inputting application software supplied in the form of a ROM cartridge.

The sub-CPU 104 is called an SMPC (System Manager & Peripheral Control), and, among other things, comprises a function, which collects via a connector 2a peripheral data from an input device 2b in accordance with a request from the main CPU 101. Based on the peripheral data received from the sub-CPU 104, the CPU 101, for example, performs processing, whereby a vehicle (object) in the game screen is made to move. A controlling device, comprising a steering wheel, an accelerator and a brake, is connected to the connector 2a. A PAD, joystick, keyboard and other optional peripherals can also be connected. By connecting two controlling devices 2b to the connector 2a, it becomes possible to have a car race competition. The sub-CPU 104 comprises functions for automatically recognizing the kindof peripheral connected to the connector 2a (main unit terminal), and gathering peripheral and other data in accordance with the communications method corresponding to the type of peripheral.

The video block 11 comprises a VDP (Video Display Processor) 120, which primarily renders objects and the like comprising video game polygon data, and a VDP 130, which primarily renders a background screen, synthesizes polygon image data (object) and a background image, and performs clipping processing.

A VRAM 121 and a plurality of frame buffers (of which two, 122, 123, are shown in the figure) are connected to VDP 120. A polygon rendering command, which displays an object of a video game machine, is sent from the main CPU 101 via the SCU 100 to VDP 120, and written to VRAM 121. VDP 120 reads the rendering command from VRAM to an internal system register, and writes rendering data to a frame buffer. The rendered data in frame buffer 122 or 123 is sent to VDP 130. VDP 120 comprises such operating functions as a texture parts display, which displays, among other things, a fixed form object, an expanding/contracting object, and a deformed object; a non-fixed form object display, which displays, among other things, a square polygon, a polyline, and a line; color operations, such as a translucent operation for similar parts, a semi-luminance operation, a shadow operation, a vignetting operation, a mesh operation, and a shading operation; and mesh processing, and clipping, which prevents rendering from extending beyond a set display area. It also comprises a geometalizer, which performs matrix operations, enabling the quick performance of enlargement, reduction, rotation, deformation, and coordinate conversion operations.

VDP 130 is configured so that it connects to VRAM 131, and image data outputted from VDP 130 is outputted via memory 132 to an encoder 160. In addition to the functions possessed by VDP 120, VDP 130 also comprises a scroll function, which controls a scroll screen display, and a priority function, which determines the order of priority of object and screen displays.

The encoder 160 generates a picture signal by applying synchronization and other signals to this image data, and outputs it to a TV receiver 5 (or a projector). This enables various game screens to be displayed on a TV receiver 5.

The sound block 12 comprises a DSP 140, which performs voice synthesis in accordance with PCM or FM, and a CPU 141, which controls this DSP 140. Voice data generated by the DSP 140 is outputted to a speaker 5*b* after being converted to a 2-channel signal by a D/A converter 170.

The subsystem 13 comprises, among other things, a CD-ROM drive 1*b*, a CD I/F 180, a CPU 181, an MPEG AUDIO 182, and MPEG VIDEO 183. This subsystem 13 comprises functions for, among other things, reading in application software supplied in the form of a CD-ROM, and animation playback.

The CD-ROM drive 1*b* reads data from a CD-ROM. CPU 181 controls the CD-ROM drive 1*b*, and performs error correction and other processing on the read data. Data read from the CD-ROM is supplied to the main CPU 101 via the CD I/F 180, bus 106 and SCU 100, and utilized as application software.

Further, MPEG AUDIO 182, MPEG VIDEO 183 are devices that restore data, which has been compressed in accordance with the MPEG (Motion Picture Experts Group) standard. Using these MPEG AUDIO 182, MPEG VIDEO 183 to restore MPEG compressed data, which has been written to CD-ROM, enables animation playback.

CPU 101 develops a car racing game in three-dimensional virtual space in accordance with a main game program and driving control data not shown in the figure. The main game program and data are supplied by a ROM cartridge, CD-ROM, floppy disk or other information storage media, and loaded into memory in advance. Further, the program and data can also be downloaded via the Internet, personal computer communications, satellite communications and other such telecommunications networks, and broadcasting and other media. CPU 101 arranges vehicular and background objects in three-dimensional virtual space, and controls the positioning, movement and other aspects of the objects by synchronizing them to the frame cycle of a TV receiver.

<Image Processing in Accordance With First Embodiment>

FIG. 2–FIG. 8 are diagrams for explaining a first embodiment of the present invention, and for explaining the technique that enables the use of texture data that exceeds the capacity of texture memory.

If the first embodiment of the present invention is explained in outline form, firstly, the texture memory is utilized by dividing it into an area for common use, an area for an even block, and an area for an odd block; secondly, texture data for displaying via display means is divided, and formed in advance into an even block, an odd block, and a common block, and, adopting the concept of area, the relation between this area and the even block/odd block is established; thirdly, even block, odd block, and common block texture data, which was divided and formed in accordance with a position where a movable object is displayed, are transferred to the above-mentioned texture memory; fourthly, texture data required around the movable object in line with the development of the game is fetched from either the even block area or the odd block area of texture memory, but when there is a change in the texture memory area in this case, a determination is made based on the relation between the even block/odd block and the area as to whether or not it is necessary to rewrite either the even block area or the odd block area of texture memory; and fifthly, when it is necessary to rewrite this block area of the above-mentioned texture memory, only the texture data of pertinent blocks that were formed in advance as described above is transferred to this block area of the above-mentioned texture memory.

Furthermore, when even block texture data or odd block texture data is transferred, rather than transferring one block of pertinent texture data en bloc, it is transferred in one sheet of texture data units (for example, 256×256 texels), of which this block is comprised.

By realizing the above-described content, it is possible to use texture data that exceeds the capacity of texture memory, and texture data in texture memory can be updated (the latest texture data) at all times.

Figure 2:
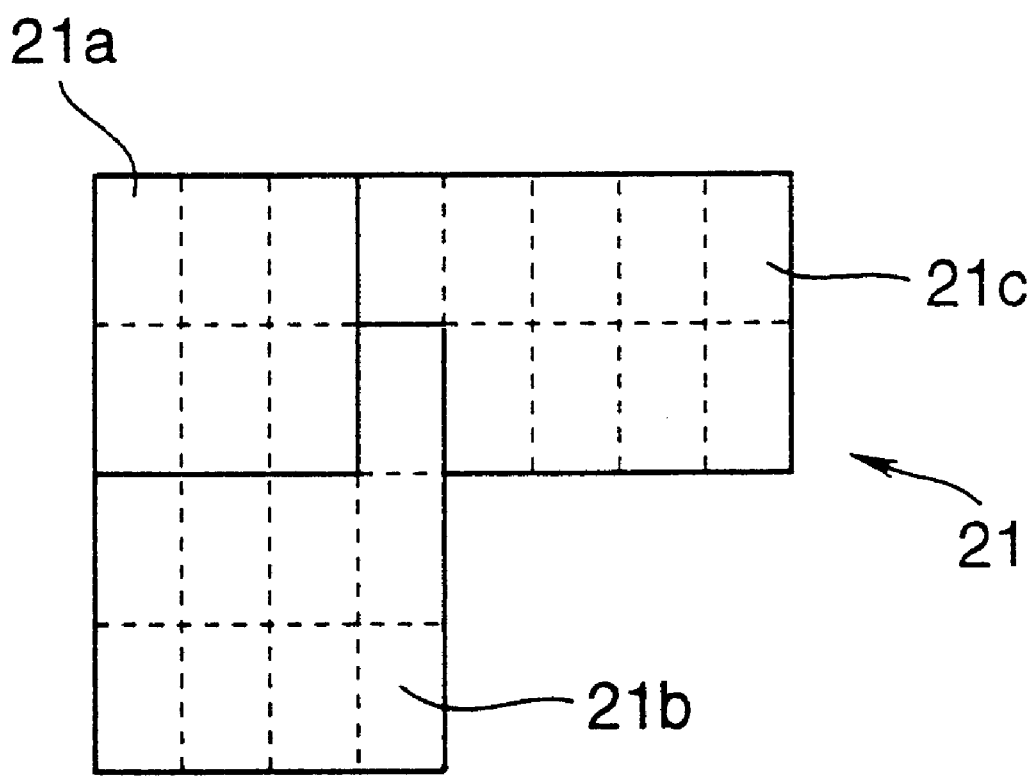
FIG. 2 is a diagram for explaining a texture memory used in the first embodiment.

FIG. 2 is a diagram for explaining the texture memory utilized in this first embodiment. In this figure, reference number 21 is texture memory, and this texture memory 21 is used by dividing it, for example, into a common area 21*a*, an even block area 21*b*, and an odd block area 21*c*. The significance of dividing texture memory like this here is that it expedites the utilization of texture memory, and the hardware remains one as is.

Here, if texture data, which treats 256×256 texels as one unit, for example, is counted as 1 sheet of texture, in this embodiment, the number of textures in the common area 21*a* comprises a maximum of 6 sheets, the number of textures in the even block area 21*b* comprises a maximum of 9 sheets, and the number of textures in the odd block area 21*c* comprises a maximum of 9 sheets. Therefore, even in FIG. 2, texture memory is displayed by dividing the area divided by dotted lines in the common area 21*a* into 6 areas, dividing the area divided by dotted lines in the even block area 21*b* into 9 areas, and dividing the area divided by dotted lines in the odd block area 21*c* into 9 areas.

Further, the common area 21*a* is used for display data such as a road, for example, a model to be displayed at all times on the screen of display means, and is not re-written during game processing.

Figure 3:
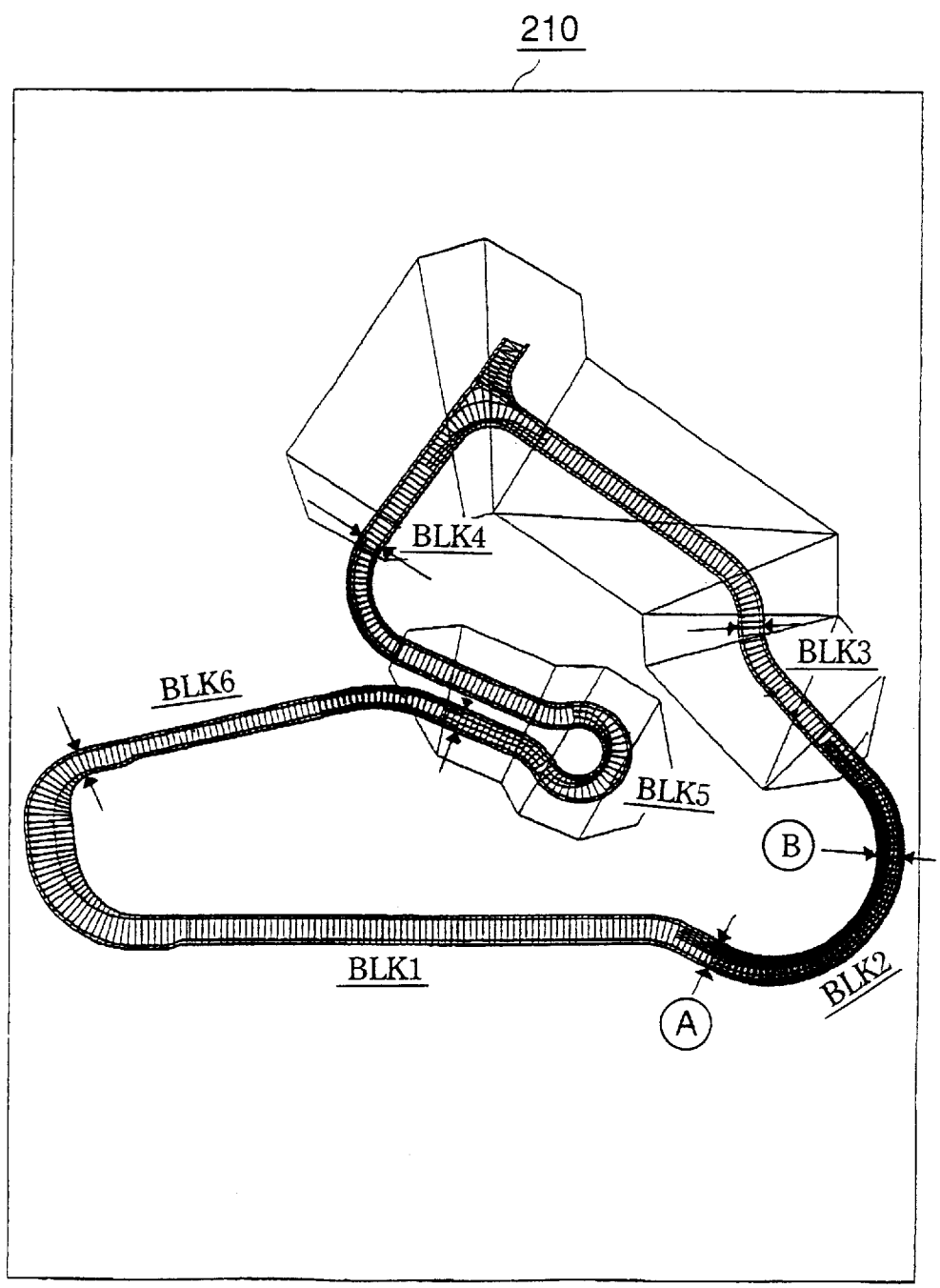
FIG. 3 is a diagram showing display data used in the first embodiment.

FIG. 3 is a diagram showing display data utilized in this first embodiment, and showing, for example, texture data for an entire car race course. As is clear from this figure, having a course for a closed-circuit car race as data for display purposes, for example, this course is normally constructed in advance as display data 210 such as that shown in FIG. 3, and is used by fetching from the above-mentioned display data 210 texture and other data required by a scene accompanying the movement of a movable object in accordance with the development of the game.

In this first embodiment, the above-described display data 210 is divided, for example, into 6 blocks, blocks BLK1, BLK2, BLK3, . . . , BLK6, as shown in FIG. 3. Furthermore, in the first embodiment, display data 210 is divided into 6 blocks, but it can also be divided into as many blocks as capacity allows.

Further, in this first embodiment, the concept of area AR is employed, and the above-described divided first block BLK1, second block BLK2, third block BLK3, . . . , and sixth block BLK6 are stored in advance by having them correspond to areas AR1, AR2, AR3, . . . , AR6. That is, blocks BLK1–BLK6 and areas AR1–AR6 are given corresponding relationships like those shown in the following FIG. 27.

Figure 4:
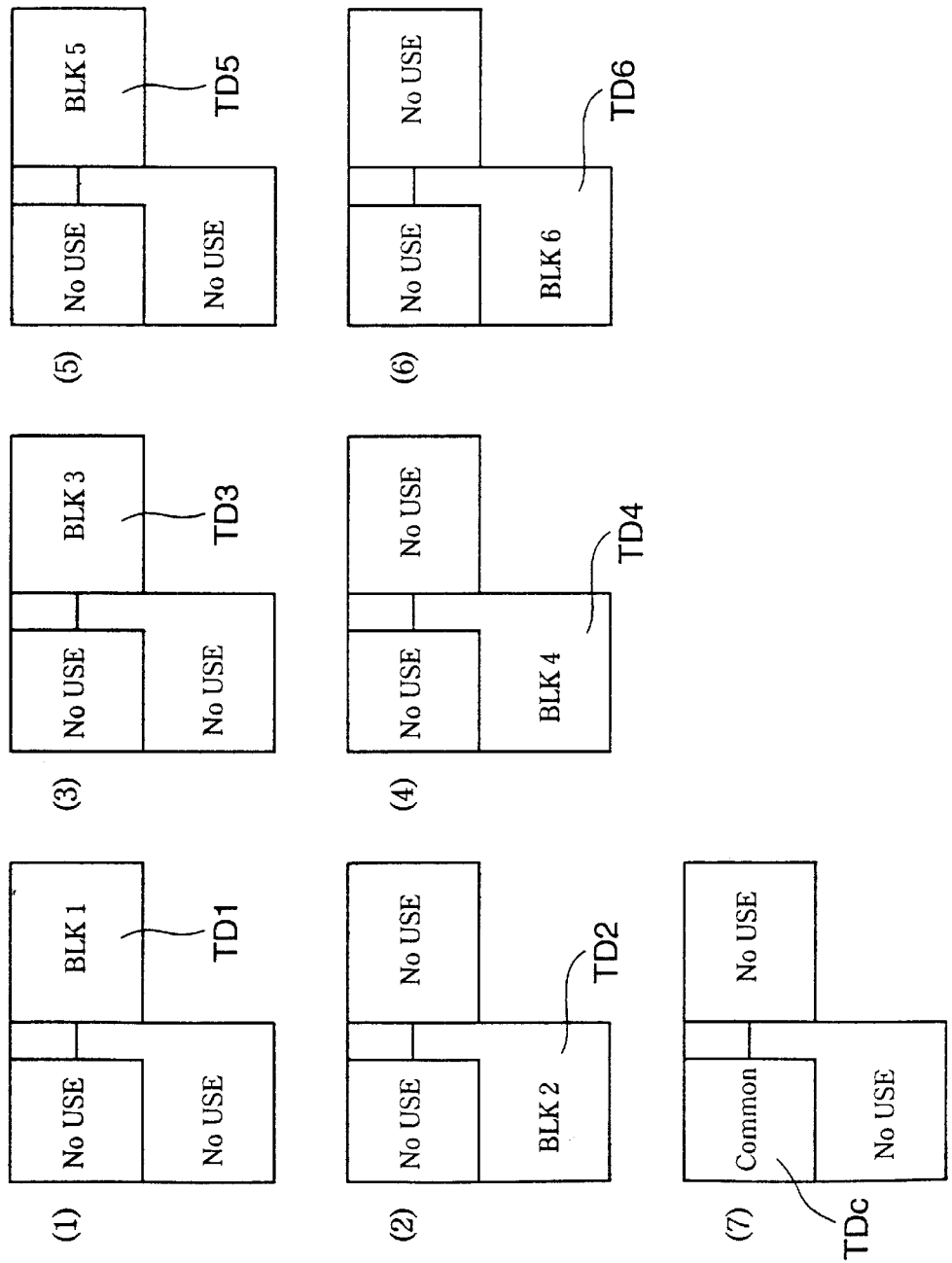
FIG. 4 is a diagram showing data stored in ROM, which is used in the first embodiment.

FIG. 4 is a diagram showing texture-related data, models, which were constructed in states that correspond to texture memory 21 with regard to the blocks BLK into which display data 210 is divided as described above, and a texture TD1 of a first block BLK1 is shown in FIG. 4 (1), a texture TD2 of a second block BLK2 is shown in FIG. 4 (2), a texture TD3 of a third block BLK3 is shown in FIG. 4 (3), a texture TD4 of a fourth block BLK4 is shown in FIG. 4 (4), a texture TD5 of a fifth block BLK5 is shown in FIG. 4 (5), and a texture TD6 of a sixth block BLK6 is shown in FIG. 4 (6), respectively.

That is, as shown in FIG. 4 (1), texture TD1 is constructed in an area corresponding to odd block area 21c in a state that corresponds to texture memory 21, and data is not constructed in the other areas corresponding to common area 21a, even block area 21b.

Similarly, as shown in FIG. 4 (2), texture TD2 is constructed in an area corresponding to even block area 21b in a state that corresponds to texture memory 21, and data is not constructed in the other areas corresponding to common area 21a, odd block area 21c.

Similarly, as shown in FIG. 4 (3), texture TD3 is constructed in an area corresponding to odd block area 21c in a state that corresponds to texture memory 21, and data is not constructed in the other areas corresponding to common area 21a, even block area 21b.

Similarly, as shown in FIG. 4 (4), texture TD4 is constructed in an area corresponding to even block area 21b in a state that corresponds to texture memory 21, and data is not constructed in the other areas corresponding to common area 21a, odd block area 21c.

Similarly, as shown in FIG. 4 (5), texture TD5 is constructed in an area corresponding to odd block area 21c in a state that corresponds to texture memory 21, and data is not constructed in the other areas corresponding to common area 21a, even block area 21b.

Similarly, as shown in FIG. 4 (6), texture TD6 is constructed in an area corresponding to even block area 21b in a state that corresponds to texture memory 21, and data is not constructed in the other areas corresponding to common area 21a, odd block area 21c.

Furthermore, as shown in FIG. 4 (7), common texture DTc(TDc) is constructed in an area corresponding to common area 21a in a state that corresponds to texture memory 21, and data is not constructed in the other areas corresponding to even block area 21b, odd block area 21c.

As described above, constructed textures TD1–TD6, TDC are stored in advance, for example, in ROM and other media.

Next, based on the above-described premise, data processing in the first embodiment is explained with reference to FIG. 5 through FIG. 11.

[Initialization State]

Figure 6:
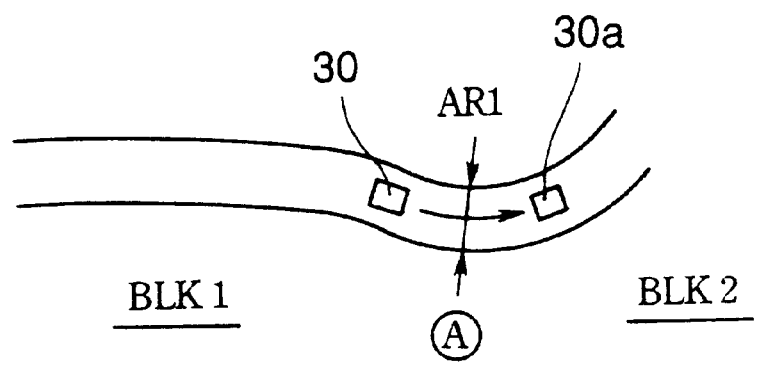
FIG. 6 is a diagram showing an example of when a game being used in the first embodiment is in the initial start state.
Figure 7:
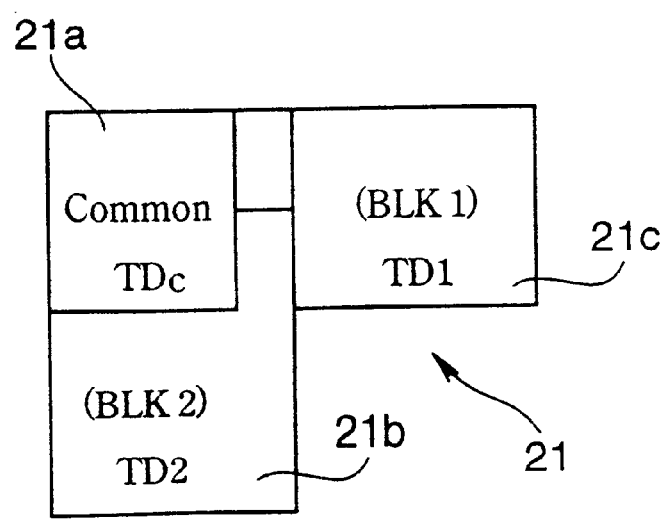
FIG. 7 is a diagram showing texture memory texture numbers in the first embodiment.

FIG. 6 is a diagram showing a situation, in which a game is in the initial start state, and FIG. 7 is a diagram showing the texture memory texture numbers at that time.

Firstly, when the game starts, in accordance with game program processing, among the movable objects, a car 30 is in the first area AR1, as shown in FIG. 6. In this case, in texture memory 21, common texture TDc is stored in common area 21a, texture TD2 is stored in even block area 21b, and texture TD1 is stored in odd block area 21c, respectively.

In a state such as this, pursuant to the development of the game program, a car 30, which is in a first block BLK1, is assumed to have moved in the direction indicated by the arrow in FIG. 6, and the car 30 moves to a second block BLK2.

[When the Car 30 Moves Between Blocks in the Same Area Number]

The situation wherein a car 30 moves between blocks in the same area number is explained with reference to FIG. 6 and FIG. 7.

Figure 5:
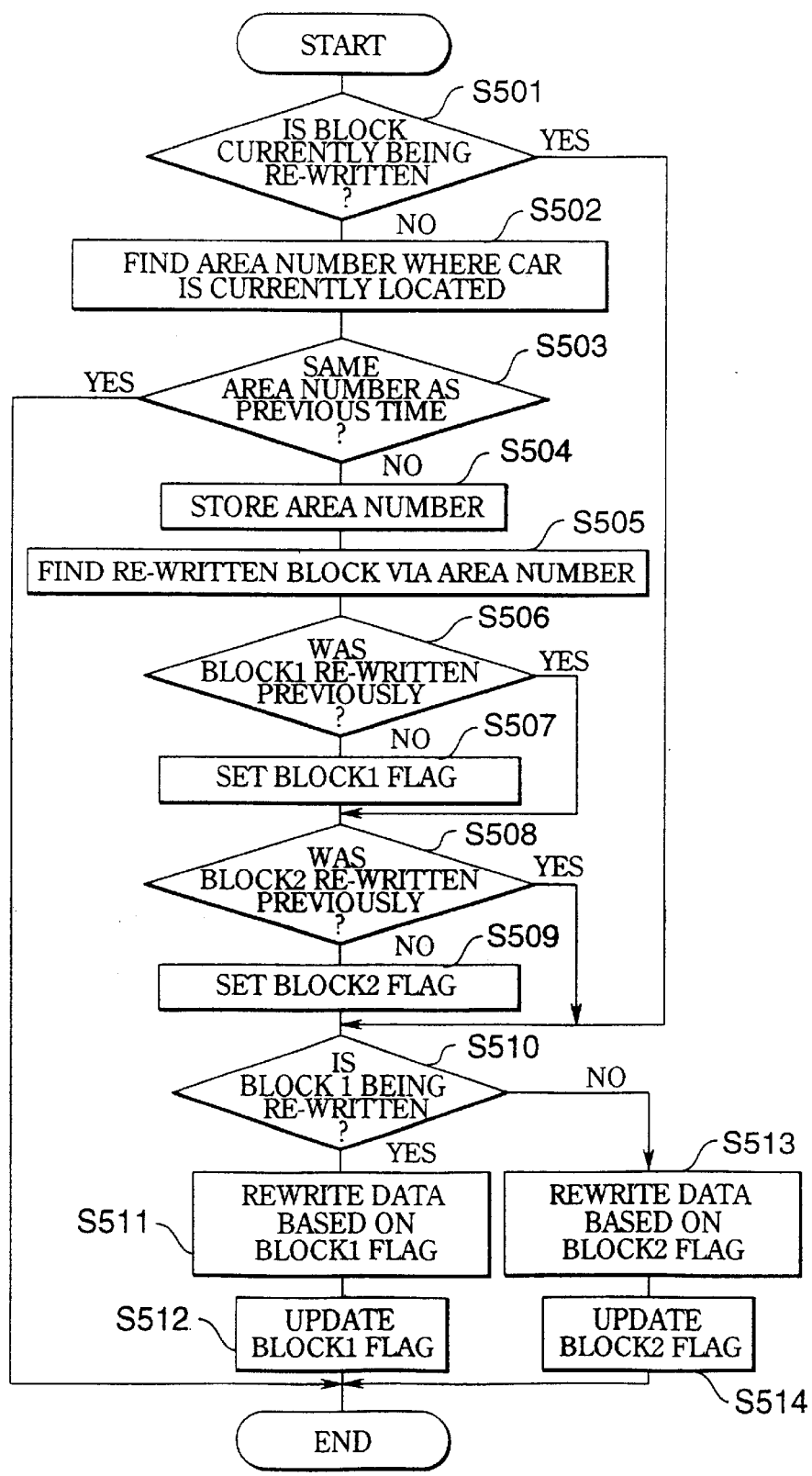
FIG. 5 is a flowchart for explaining the operation of the first embodiment.

Here, the flowchart in FIG. 5 is executed at each prescribed time period. Firstly, a determination is made as to whether an even block or odd block is currently being re-written (S501). Since rewriting is not being performed in this case (S501: NO), the area number, where a car 30 is currently located, is sought (S502).

Here, since a first block BLK1 and a second block BLK2 from Table 1 (FIG. 27) are associated as a second area AR2, the area number becomes AR2, and it is determined to be the same area number (S503). Therefore, because there is no change in the number of the area AR (S503: YES), this process is omitted, and texture transfer is not performed.

[When the Car 30 Moves Between Blocks in Different Area Numbers]

Figure 8:
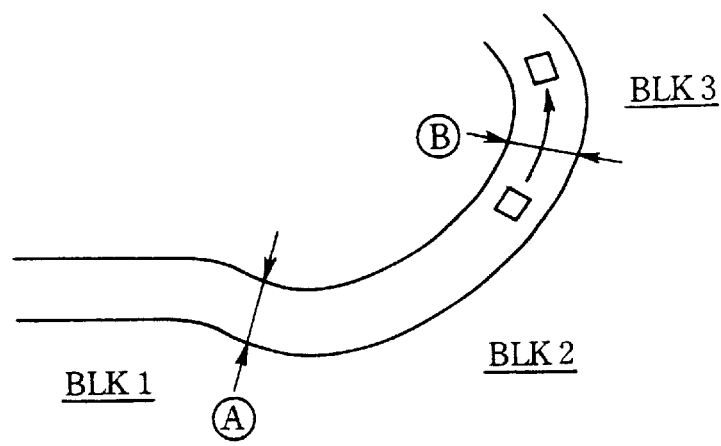
FIG. 8 is a diagram showing the relation between a vehicle and course block numbers in the first embodiment.
Figure 9:
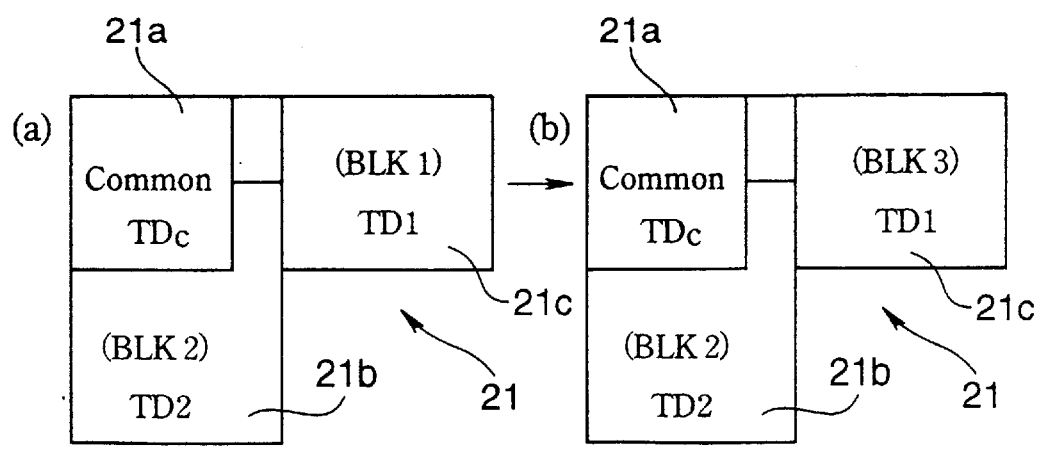
FIG. 9 is a diagram showing texture memory states in the first embodiment.

A situation, wherein a car moves between blocks in different area numbers, is explained with reference to FIG. 8 and FIG. 9. Furthermore, FIG. 8 is a diagram showing the association between a car and a course block number, and FIG. 9 is a diagram showing the state of texture memory. Further, FIG. 9(a) is a diagram showing the state of texture memory when a car moves within the same block, and FIG. 9(b) is a diagram showing the state of re-written texture memory when a car moves in different area numbers.

Next, under the above-described conditions, a car 30 is assumed to have moved from a second block BLK2 to a third block BLK3, as shown in FIG. 8, in accordance with the development of the game program.

Here, the flowchart in FIG. 5 is executed at each prescribed time period. Firstly, a determination is made as to whether an even block or odd block is currently being re-written (S501). In this case, since rewriting is not being performed (S501: NO), the area number, where a car 30 is currently located, is sought (S502).

Here, since a second block BLK2 and a third block BLK3 from Table 1 (FIG. 27) are associated as a third area AR3, the area number becomes AR3, and it is determined that the area number (AR3) differs from the previous number (AR2) (S503). Therefore, because the number of the area AR changed (S503: NO), this area number (AR3) is stored (S504), and the block number (BLK) to be re-written in accordance with this area number (AR3) is sought. In this case, since it is clear that the texture TD3 of the third block BLK3 is to be re-written (S505), a determination is made as to whether an odd block area 21c corresponding to the odd block was previously re-written (S506). Here, since the odd block area 21c corresponding to the odd block was not previously re-written (S506: NO), a flag is set for this odd block (S507). Further, a determination is made as to whether an even block area 21b corresponding to the even block was previously re-written (S508). Here, since the even block area 21b corresponding to the even block was not previously re-written (S508: NO), a flag is set for this even block (S509).

Then, a decision is made as to whether the odd block is in the process of being re-written (S501). Here, since rewriting is to be performed (S510: YES), based on this odd block flag, text ure TD3 corresponding to the third block is transferred to an odd block area 21c of texture memory 21, the odd block area 21c is re-written (S511), and this odd block flag is updated (S51 2). Rewriting is performed in accordance with this, as shown in FIG. 9(a), by storing a texture TD2 corresponding to the second block BLK2 in an even block area 21b, and storing a texture TD1 corresponding to a first block in an odd block area 21c in texture memory 21, and, as shown in FIG. 9(b), by transferring a texture TD2 corresponding to the second block BLK2 to an even block area 21b, and transferring a texture TD1 corresponding to a third block to an odd block area 21c in texture memory 21. Further, the texture TD2 in an even block area 21b is not re-written.

Furthermore, when the need to rewrite an even block area 21b of texture memory arises, the processes for steps S501–S510, S513, S514 of the flowchart in FIG. 5 are executed, and an even block area 21b is re-written.

For example, when textures TD1–TD6, which are stored in ROM or the like, are transferred to an even block area 21b or an odd block area 21c of texture memory 21, the entire area's worth of data in this even block area 21b or odd block area 21c is not transferred en bloc, but rather, one sheet's worth (256×256 texels) is transferred per frame. By doing this, transfer time is shortened. This is because, for a game machine of the present invention, processing time is limited, and this must be dealt with.

[When Car Travels Course Backward]

Figure 10:
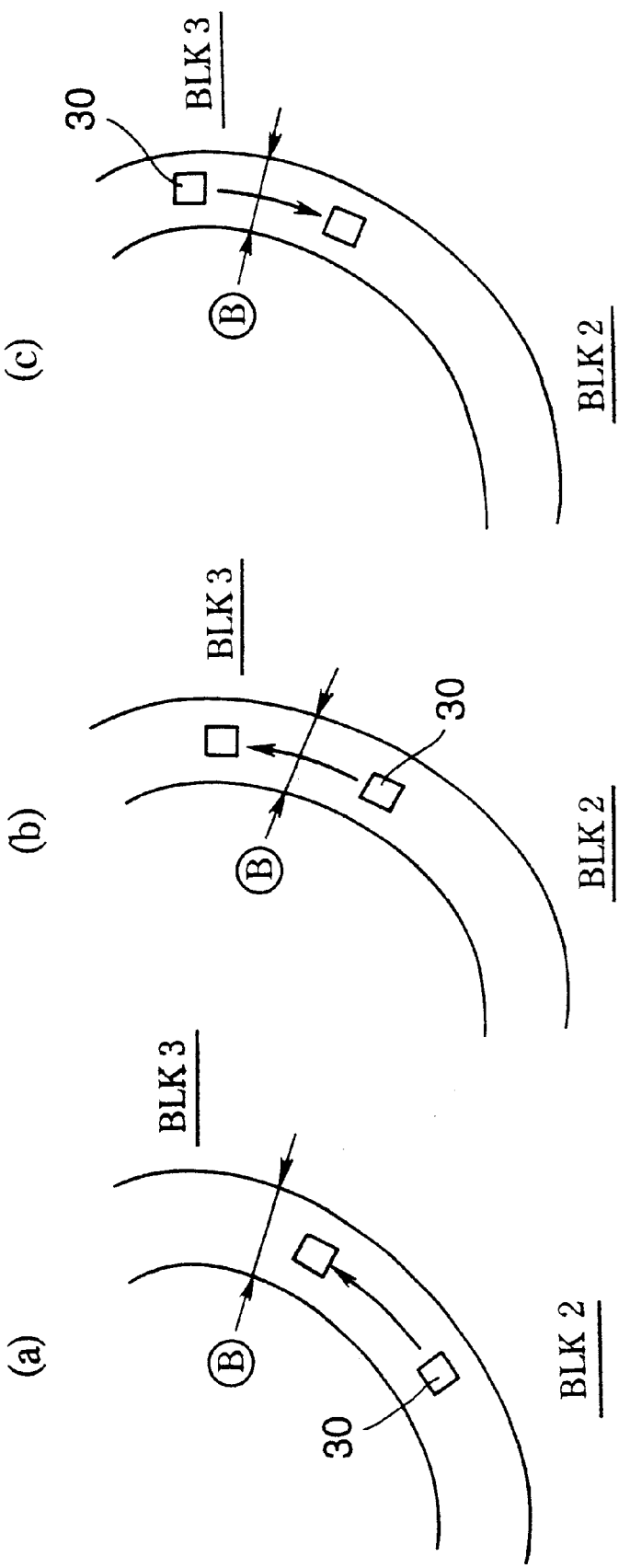
FIG. 10 is a diagram of when a vehicle is traveling over a course in the first embodiment.

The operation when a car travels a course backward is explained with reference to FIG. 10, FIG. 11. Here, FIG. 10 is a diagram of when a car travels over a course, and FIG. 10(a) shows the traveling state in block BLK2, FIG. 10(b) shows the state when the car moves from block BLK2 to block BLK 3, and FIG. 10(c) shows the state when the car travels backward from block BLK3 to block BLK2, respectively.

Figure 11:
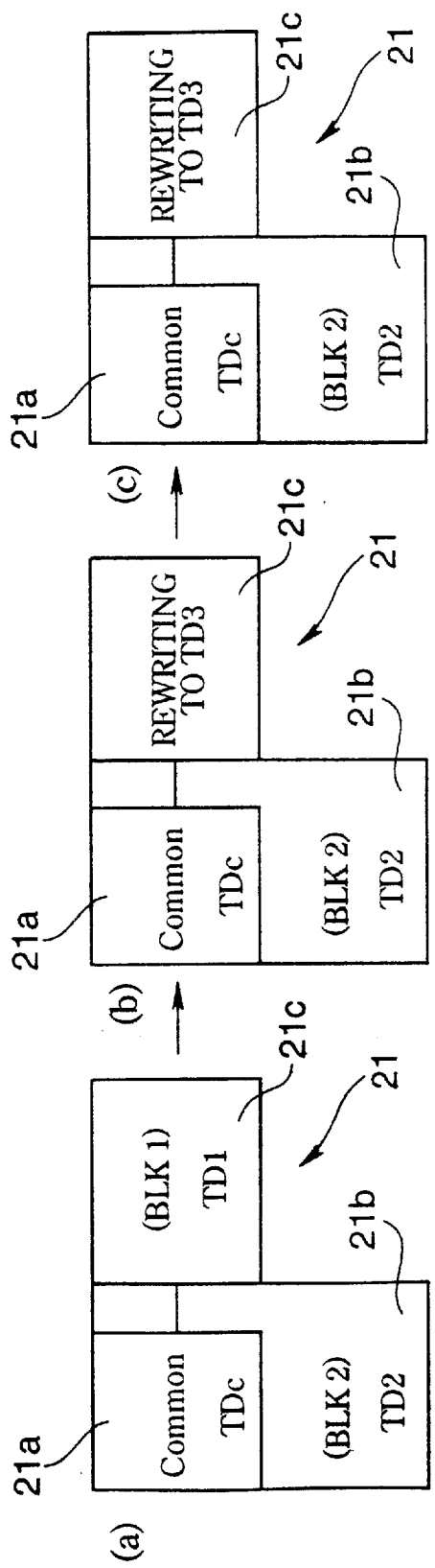
FIG. 11 is a diagram showing texture memory states in the first embodiment.

Further, FIG. 11 shows the stat us of texture memory in the above-described states, and FIG. 11(a) shows t he status of memory for the state in FIG. 10(a), FIG. 11(b) shows the status of memory for the state in FIG. 10(b), and FIG. 11(c) shows the status of memory for the state in FIG. 10(c), respectively.

When it is the state in FIG. 10(a), texture memory 21, as shown in FIG. 11(a), stores a common texture TDc in a common area 21a, stores a texture TD2 corresponding to the second block BLK2 in an even block area 21b, and stores a texture TD1 corresponding to the first block BLK1 in an odd block area 21c, respectively. Then, processing for steps S501, S502, S503 is executed, and rewriting does not occur for either an even block area 21b or an odd block area 21c of texture memory 21.

Further, when it is the state in FIG. 10(b), steps S501–S512 are processed the instant the car moves from block BLK2 to block BLK3, and thereafter, steps S501, S510, S511, S512 are processed, and, as shown in FIG. 11(b), an odd block area 21c is subjected to rewriting.

Under these circumstances, even when a car suddenly changes its direction of progress and travels backward from block BLK3 to block BLK2, as shown in FIG. 10(c), since the area AR3 is the same, the rewriting of texture TD does not occur. An area check (S503) is not performed during this period, but since it is the same area AR3, this does not cause a problem, and, as shown in FIG. 11(c), the rewriting of an odd block area 21c [to reflect] a texture TD3 corresponding to a third block BLK3 continues (S501–S510–S511–S512).

In accordance with a first embodiment such as this, it is possible to utilize texture data that exceeds the capacity of texture memory, and texture data can be kept up-to-date at all times.

<Image Processing in Accordance with Second Embodiment>

FIG. 12–FIG. 17 are diagrams presented for explaining a second embodiment of the present invention, and are diagrams for explaining the technique for attempting to achieve a background image which conforms to the speed of travel of a movable object.

An overview of a second embodiment of the present invention is explained. First, the second embodiment has as an object of Being able to realize a natural-feeling screen by achieving a background screen that conforms to the speed of a movable object, and being able to shorten data transfer time for achieving a screen such as this.

Then, in accordance with the second embodiment, a plurality of textures related to a background screen are provided, background screen data of a movable object that is either stationary or in a low-speed state is provided to a first texture, background screen data of when a movable object is in a low-speed or faster state of travel is provided to the remaining second texture in accordance with a velocity region, and then, the second texture is mapped onto the screen in addition to the first texture in accordance with the velocity state of the movable object.

Performing this kind of image processing makes it possible to achieve a background screen, which conforms to the state of the travel velocity of a movable object, thus enabling image processing, which is natural and rich in expressive power.

Figure 12:
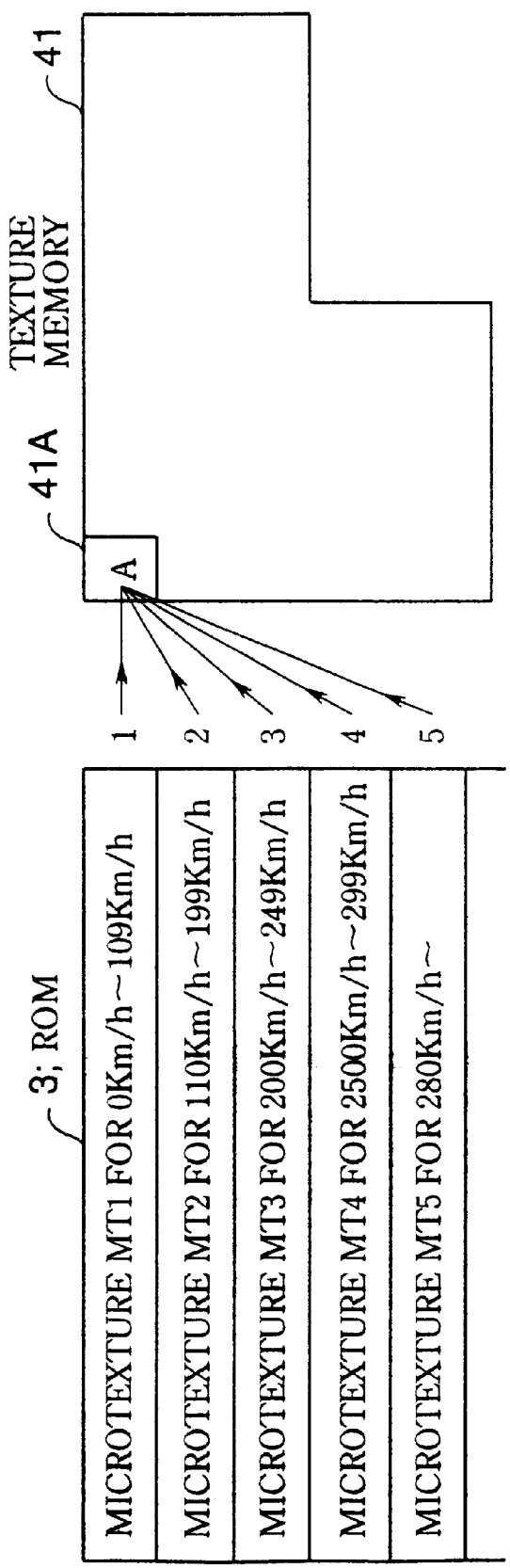
FIG. 12 is a diagram showing the state of memory means for explaining a second embodiment.

FIG. 12 is a diagram showing the status of storage means for explaining the second embodiment of the present invention. In this FIG. 12, reference number 31 is ROM, and reference number 41 is texture memory.

First, for example, the velocity of a movable object is classified as:

(1) 0 [km/h]–109 [km/h]

(2) 110 [km/h]–199 [km/h]

(3) 200 [km/h]–249 [km/h]

(4) 250 [km/h]–279 [km/h]

(5) 280 [km/h–

A microtexture is provide to ROM 31 in accordance with this classification.

A microtexture (second texture) MT1 is stored in advance for speeds (1) 0 [km/h]–109 [km/h].

A microtexture (second texture) MT2 is stored in advance for speeds (2) 110 [km/h]–199 [km/h].

A microtexture (second texture) MT3 is stored in advance for speeds (3) 200 [km/h]–249 [km/h].

A microtexture (second texture) MT4 is stored in advance for speeds (4) 250 [km/h]–279 [km/h].

A microtexture (second texture) MT5 is stored in advance for speeds (5) 280 [km/h] and over.

Further, a normal texture (first texture) TD of when a movable object is stationary or traveling at low speed is stored in advance in the same ROM 31.

Further, the microtextures MT1–MT5 stored in the above-mentioned ROM 31 are transferred to an area 41a of texture memory 41.

Figure 13:
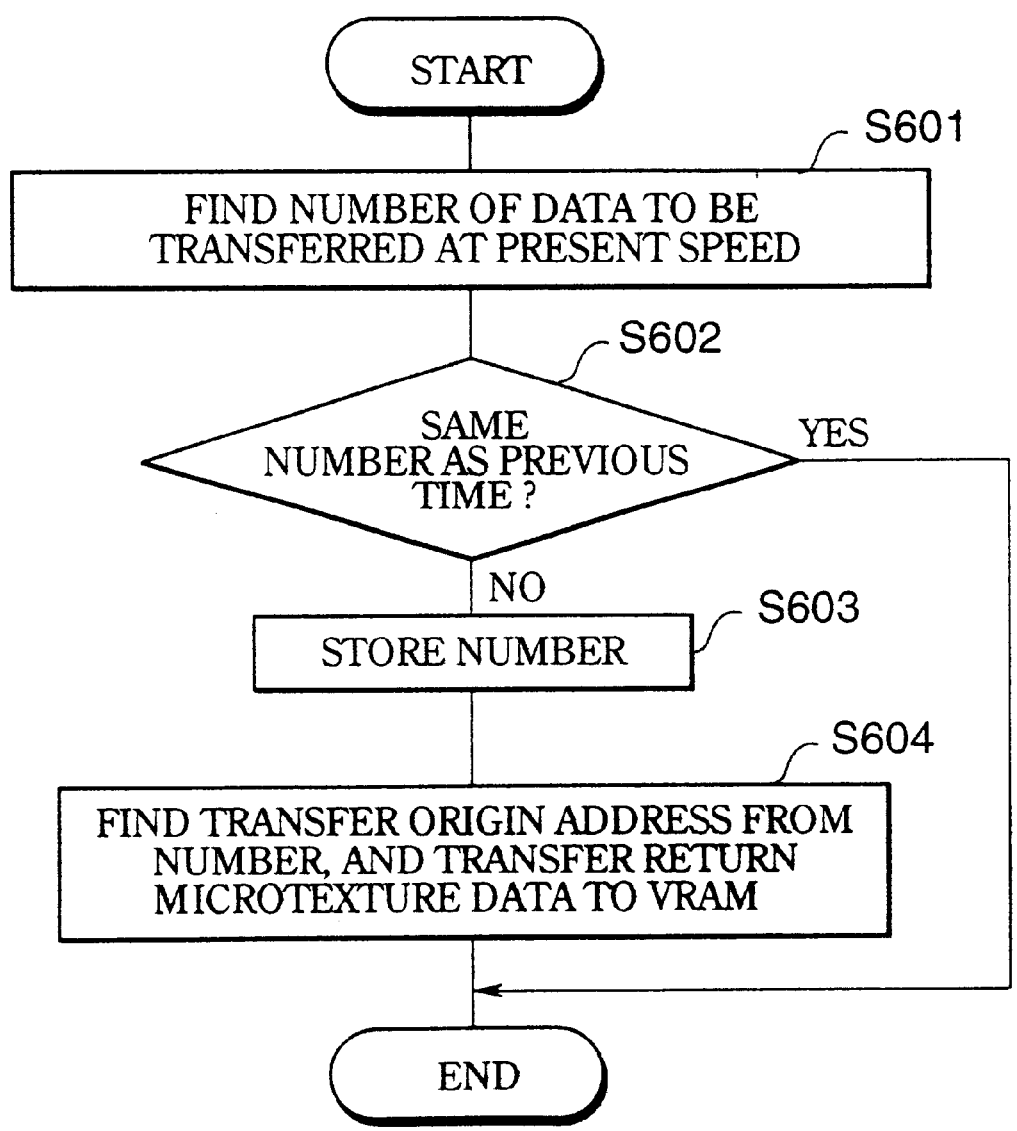
FIG. 13 is a flowchart for explaining image data processing implemented in the second embodiment.

FIG. 13 is a flowchart for explaining the image data processing implemented in this second embodiment. If an explanation is given with reference to this figure, during game processing, the velocity of a movable object is checked at all times (S601). In this step 601, the number of the microtexture MT to be transferred is sought from the velocity of the movable object.

Next, a determination is made as to whether or not the number of the previously-transferred microstructure MT is the same as the number of the microstructure MT transferred this time (S10 1(S602). If it is not the same number (S602: NO), this obtained number is stored (S603), the transfer origin address is sought from this number, a microtexture (second texture) MTm (for example, m=1, 2, . . . , 5) is read out from a prescribed address in ROM 31, and transferred to an area 41a of texture memory 41 (S604).

First, background image data of when a movable object is stationary, for instance, a first texture TD, is transferred to a prescribed area of texture memory, thereby completing the transfer.

[Operation When Movable Object's Stationary or Low Speed]

Figure 14:
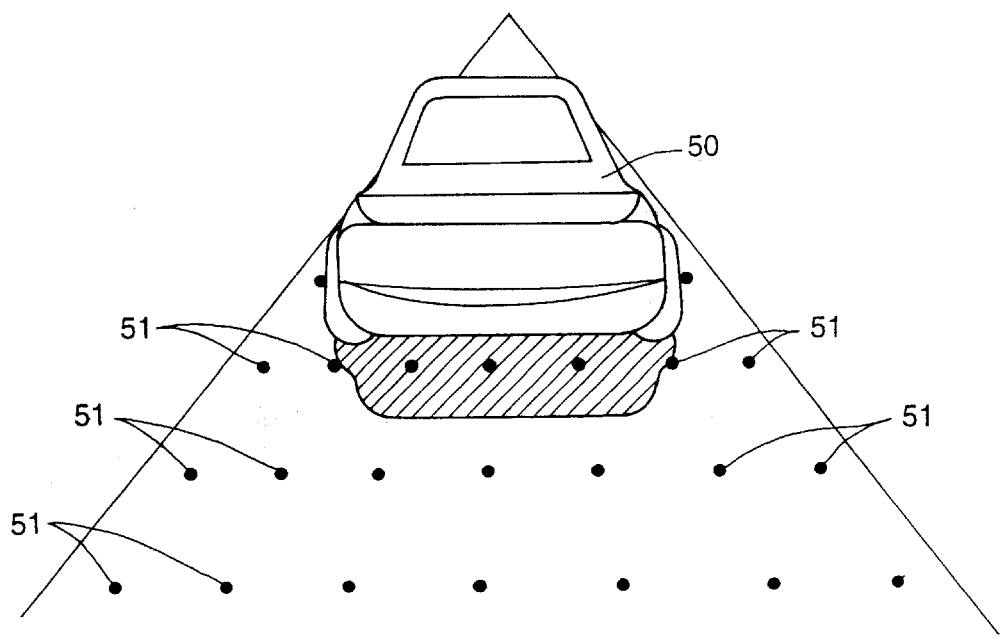
FIG. 14 is a diagram showing an example of a screen in a stationary state in the second embodiment.

At this point, the velocity of a movable object is checked, and is determined to be in the velocity region from stationary to low speed, microtexture MT1 is fetched from an area in ROM 31, and is written into an area 41a of texture memory 41 (S601–S604). In other words, microtexture MT1 is mapped to the first texture TD. In accordance with this, a movable object 50 and stationary road markings 51 are displayed on a CRT as shown in FIG. 14. Furthermore, thereafter, if the movable object 50 is stationary, steps S601, S602 are processed, and the movable object 50 and stationary road markings 51 are displayed on a CRT as shown in FIG. 14.

[Operation When Velocity of Movable Object's Faster Than Low Speed, i.e. Intermediate Speed]

Next, the velocity of the movable object is checked, and is determined to be in the second velocity region, microtexture MT2 is fetched from an area in ROM 31, and is written to an area 41a of texture memory 41 (S601–S604). In other words, microtexture MT2 is mapped to the first texture TD.

Figure 15:
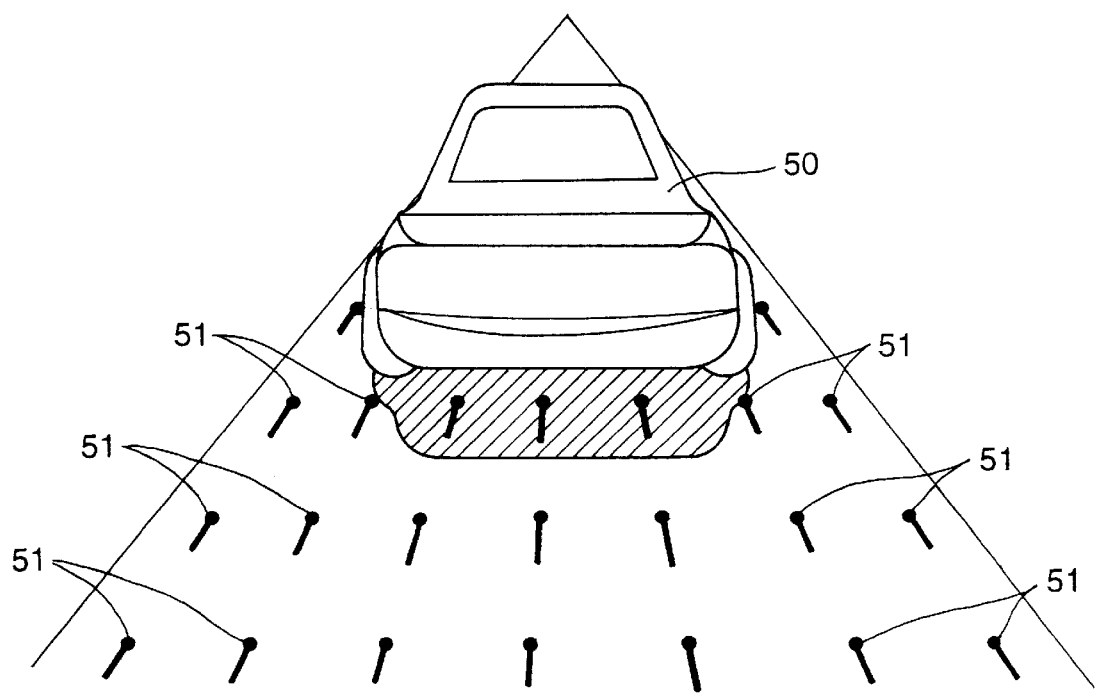
FIG. 15 is a diagram showing an example of a screen in an intermediate speed state in the second embodiment.

When this happens, the movable object 50, and stationary road markings 51, which are displayed in accordance with the first texture TD, which is written into texture memory 41, are displayed on a CRT as shown in FIG. 15, with the road markings being in a slightly flowing state in accordance with microtexture (second texture) MT2, which is written into area 41a of texture memory 41.

[Operation When Velocity of Movable Object Faster Than Low Speed, i.e. High Speed]

Next, the velocity of the movable object is checked, and is determined to be in the third velocity region, microtexture MT3 is fetched from an area in ROM 31, and is written to an area 41a of texture memory 41 (S601–S604). In other words, microtexture MT3 is mapped to the first texture TD.

Figure 16:
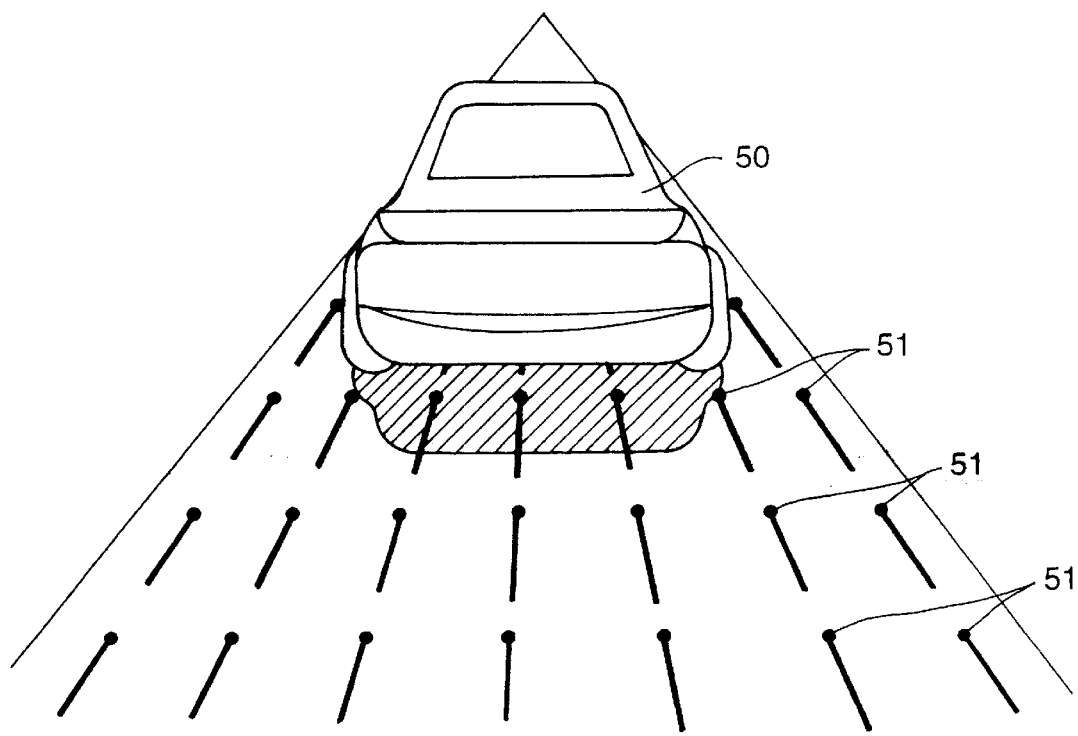
FIG. 16 is a diagram showing an example of a screen in a high speed state in the second embodiment.

When this happens, the movable object 50, and stationary road markings 51, which are displayed in accordance with the first texture TD, which is written into texture memory 41, are displayed on a CRT as shown in FIG. 16, with the road markings being in a considerably flowing state in accordance with microtexture (second texture) MT3, which is written into area 41a of texture memory 41.

[Operation When Velocity of Movable Object's Faster Than Low Speed, i.e. Faster Than High Speed]

Next, the velocity of the movable object is checked, and is determined to be in the fourth velocity region, microtexture MT4 is fetched from an area in ROM 31, and is written to an area 41a of texture memory 41 (S601–S604). In other words, microtexture MT4 is mapped to the first texture TD.

Figure 17:
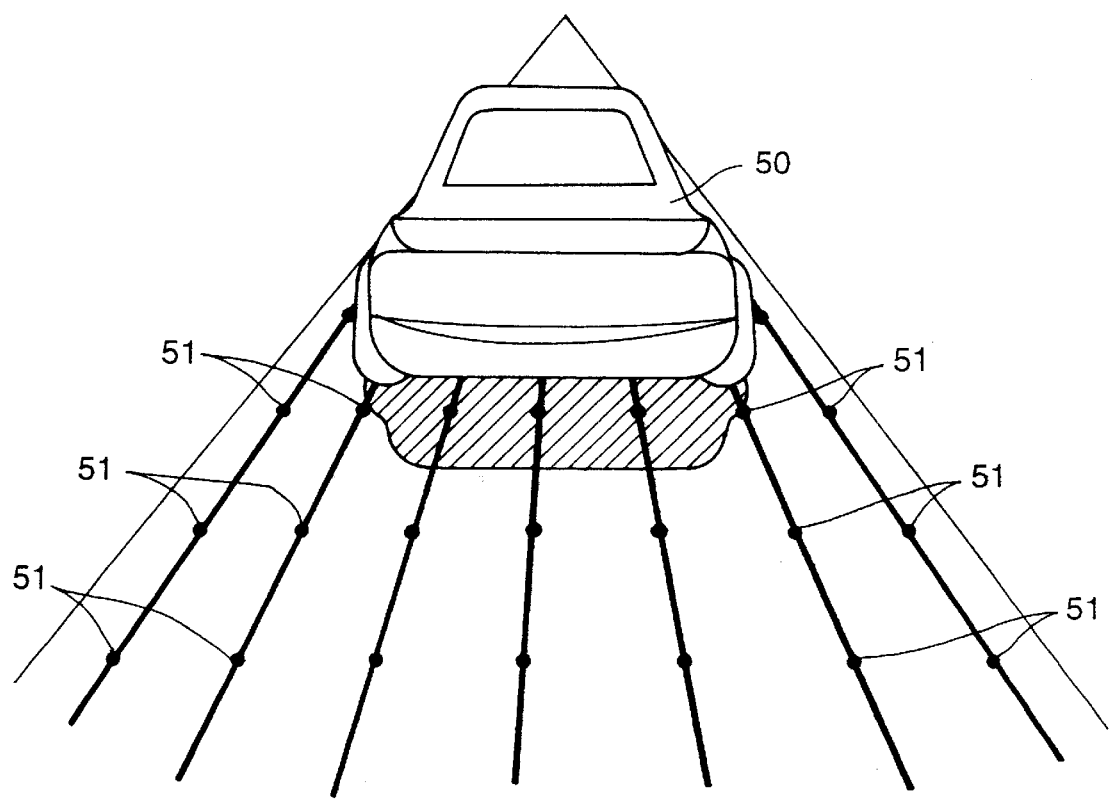
FIG. 17 is a diagram showing an example of a screen in an even higher speed state in the second embodiment.

When this happens, the movable object 50, and stationary road markings 51, which are displayed in accordance with the first texture TD, which is written into texture memory 41, are displayed on a CRT as shown in FIG. 17, with the road markings being in a state, wherein they are completely flowing in a continuous linear shape in accordance with microtexture (second texture) MT4, which is written into area 41a of texture memory 41.

In this fashion, the second embodiment, by continually checking the velocity of the movable object, fetching a background screen texture that is commensurate with the velocity of the movable object, and transferring this texture to a prescribed area 41a of texture memory 41, enables the display on a CRT of a background screen that conforms to the velocity of a movable object by mapping a second texture to the first texture.

In accordance with this, a background screen that conforms to the velocity of a movable object is displayed, and the expressive power of the screen is enhanced. Further, since changing a background screen in accordance with the velocity state of a movable object is a simple matter of transferring a second texture, the time required for transfer can be shortened, and transfer data can be reduced.

<Image Processing in Accordance with Third Embodiment>

FIG. 18–FIG. 26 are diagrams presented for explaining a third embodiment of the present invention, and are diagrams for explaining the technique, which makes it possible to express in a diversified fashion movable object damage, which conforms to travel velocity and the direction of impact, when a movable object crashes during movement.

With regard to the third embodiment of the present invention, a summary thereof is explained. First, the third embodiment has as an object the processing of images for effectively displaying damage resulting from the crash of a car, which is a movable object, and the heightening of the dramatic effect when a game machine performs such processing.

Further, in accordance with this third embodiment, (1) the car's direction of impact is detected; (2) the car's impact velocity (energy) is detected; and (3) these data are reflected in the deformation of the car.

More specifically, the third embodiment (i) provides polygondata for an entire car in a state, wherein the car has not been hit; (ii) provides polygon data for an entire car in a state, wherein the car has been damaged; (iii) provides data that corresponds to the vertex and number of each polygon block; (iv) determines which block from data on the direction from which the car was hit; and (v) interpolates, using either a primary or secondary expression from (i) data and (ii) data, polygon data corresponding to the damage of this block in accordance with the velocity (energy: direction along a normal vector to a wall (other car)) at which the car impacted.

Further, it performs texture mapping for an ordinary undamaged texture (first texture) and a damaged texture (second texture), controls the transparency parameters of both, and, ordinarily, displays these so that only the ordinary texture is visible. That is, in this case, it sets a high transparency parameter for the latter texture.

In brief, in this case, by changing the transparency parameters of a first texture and second texture, it is possible to display the first texture at times, and to display the second texture at other times. Then, by changing the transparency parameters in accordance with the state of impact, it is possible to render a post-crash state more realistically.

Performing this kind of image processing makes it possible to achieve a background screen, which conforms to the state of the travel velocity of a movable object, thus enabling image processing, which is natural and rich in expressive power.

(Premise of Third Embodiment)

Figure 18:
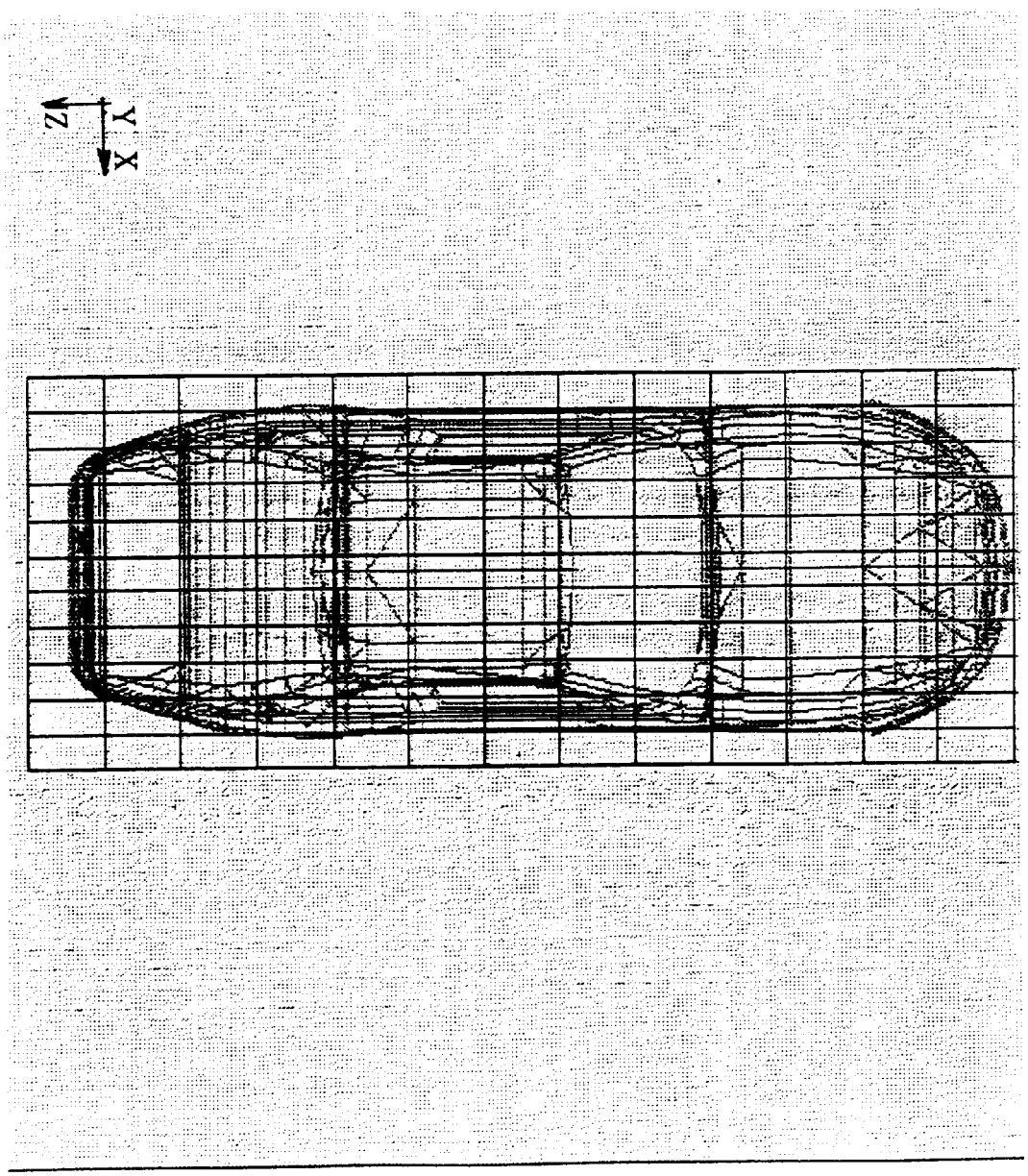
FIG. 18 is a diagram showing an example of a screen in which a vehicle is divided into blocks in a third embodiment.
Figure 19:
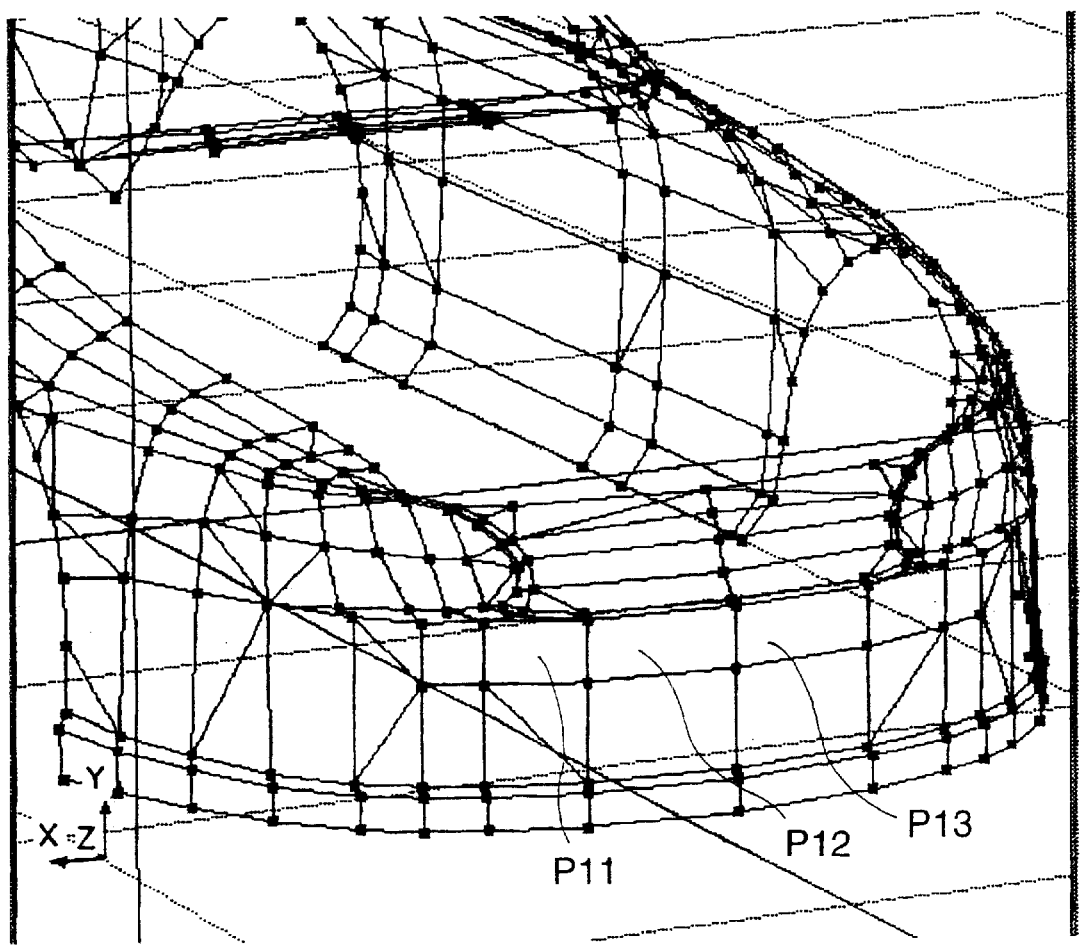
FIG. 19 is a diagram showing an example of a screen in which a normal vehicle is divided into blocks in the third embodiment.
Figure 20:
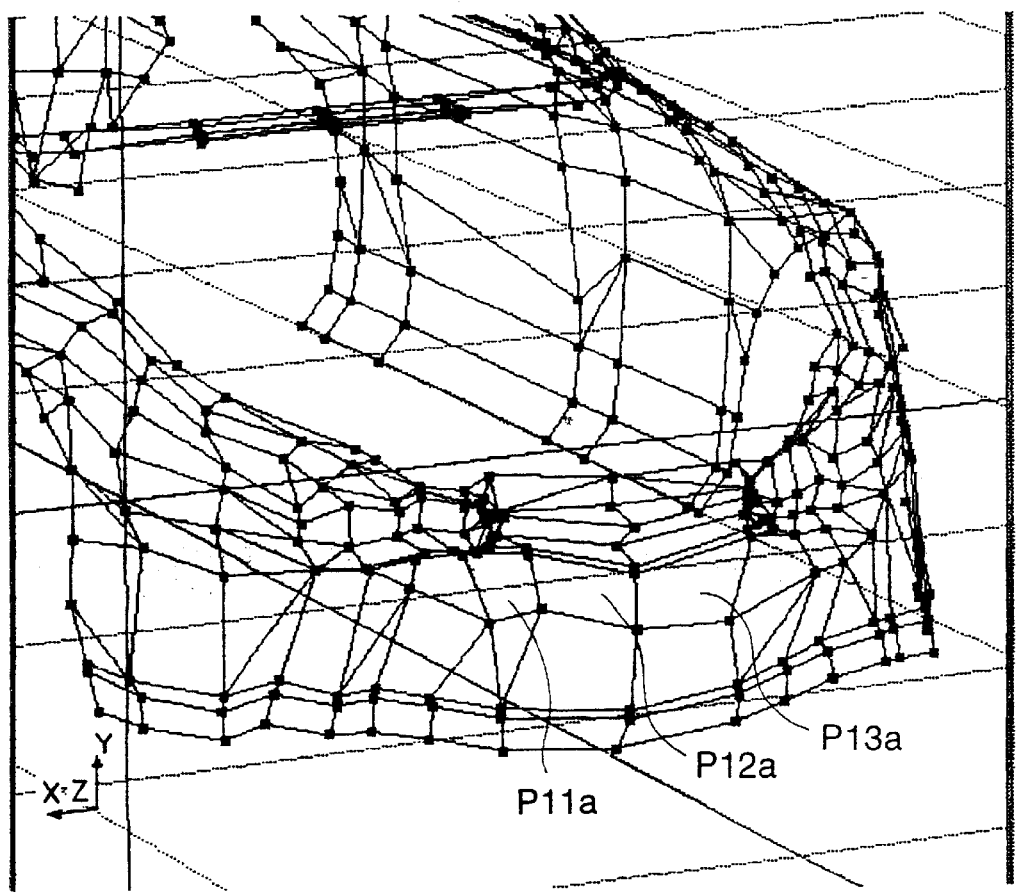
FIG. 20 is a diagram showing an example of a screen in which a crashed vehicle is divided into blocks in the third embodiment.

FIG. 18 shows a plan view of a state, in which a car, which is a movable object, is divided into blocks, and this dividing into blocks achieves the plane-side polygon data, which comprises the car. FIG. 19 is a diagram of the same block-divided state, showing an example of polygon data for a portion of a car in a normal state prior to a crash. FIG. 20 is a diagram of the same block-divided state, showing an example of polygon data for a portion of a car in a post-crash damaged state.

Figure 21:
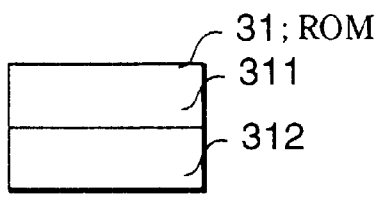
FIG. 21 is a diagram showing an example of ROM used in the third embodiment.

In the portion of a car shown in FIG. 19, polygon data P11, P12, P13, . . . , for example, corresponds to polygon data P11a, P12a, P13a, . . . , for example, in FIG. 20. Further, in FIG. 19, FIG. 20, polygon data for a portion of a car is displayed, but, of course, polygon data for the entire car (not shown in figure) is stored in advance in ROM 31, as shown in FIG. 21.

For example, polygon data for an entire car, to include polygons for a portion of a normal car, which are shown in FIG. 18 and FIG. 19, are stored in advance in area 311 of ROM 31. Further, for example, polygon data for an entire car, to include polygons for a portion of a damaged car, which is shown in FIG. 20, are stored in advance in area 312 of ROM 31.

[Operation]

Figure 22:
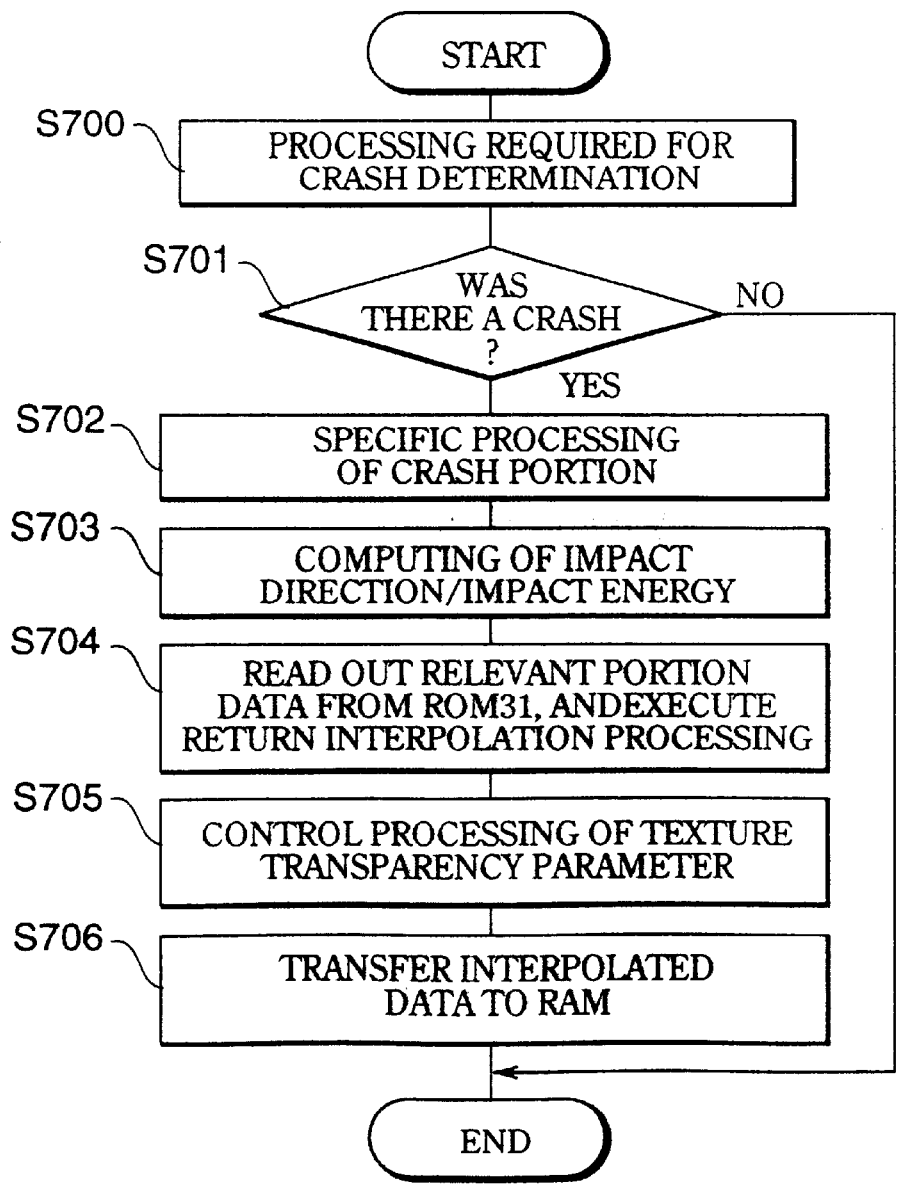
FIG. 22 is a flowchart for explaining the operation of the third embodiment.
Figure 23:
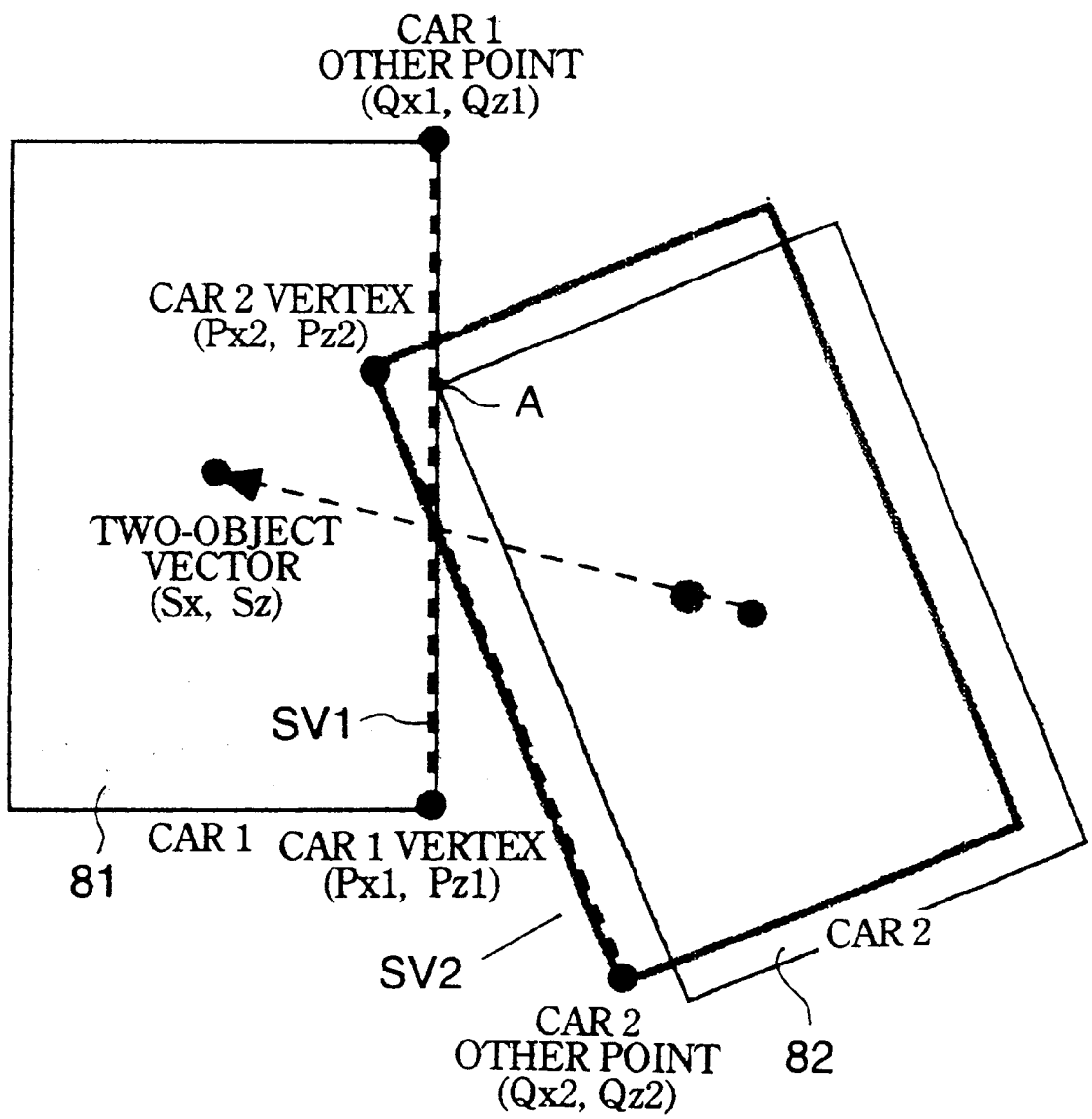
FIG. 23 is a diagram for explaining the crash determination method when a vehicle crashes in the third embodiment.
Figure 24:
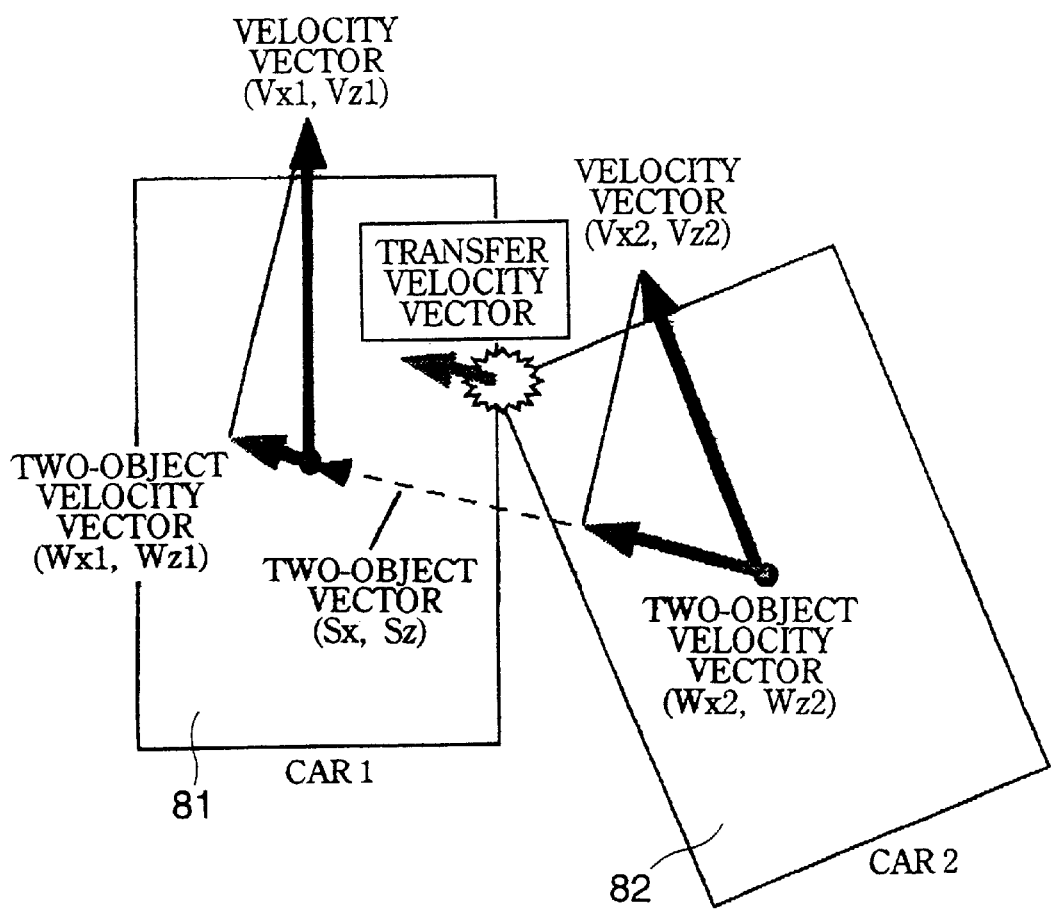
FIG. 24 is a diagram for explaining the transfer of speed when two vehicles collide in the third embodiment.

FIG. 22 is a flowchart for explaining the operation of the third embodiment. Further, FIG. 23 is a diagram for explaining a crash determination method when a car crashes, and FIG. 24 is a diagram for explaining the transfer of velocity when two cars collide.

First, in accordance with this flowchart, the necessary processing is performed for determining whether or not a crash has occurred (S700).

This processing is performed as follows. First, a vector joining the centers of the two objects, car 81 and car 82, is considered a two-object vector (Sx, Sz). Furthermore, (S'x, S'z) is considered a normalized vector (unit vector) of the two-object vector (Sx, Sz)

Using the inner product of each point coordinate and the normalized vector (S'x, S'z), a check is made to determine which point is closest to the other car. The vertex of car 81 (Px1, Pz1) is considered the point on car 81 that is closest to car 82. The vertex of car 82 (Px2, Pz2) is considered the point on car 82 that is closest to car 81.

If a normalized vector perpendicular to the two-object vector is assumed to be (Tx, Tz)=(−S'z, S'x), the inner product of each point and the above-mentioned vector (Tx, Tz) is used to find the points of the cars, which sandwich the vertices (vertex of car 81, vertex of car 82), and these are considered the other points. Therefore, the other point of car 81 is other point (Qx1, Qz1), and the other point of car 82 is other point (Qx2, Qz2). Car 81 line segment vector SV1, and car 82 line segment vector SV2 are sought from the differences between the vertices and the other points.

Furthermore, in accordance with the outer product of these line segment vectors SV1, SV2 and the two-object vector, a determination is made as to which of the line segment vectors SV1, SV2 forms an acute angle with the two-object vector. Here, because the car 82 line segment vector SV2 forms an acute angle, the vertex of this line segment vector SV2 is assumed to make contact with the other line segment vector SV1.

In this case, a determination is made as to the point of car 82 that contacts the line segment of car 81. Therefore, it can be determined that a crash occurred at the point in time where the point of car 82 reached the line segment of car 81 (S701).

Then, once it is determined that a crash occurred (S701:YES), processing to determine the location, where the point of car 82 makes contact with the line segment of car 81 is executed (S702) Here, the vertex of car 82 comes in contact with the line segment of car 81, by finding the interior division of the inner product of this contacting vertex and the normalized vector (Tx, Tz), and the inner product value of 2 points of the line segment and the normalized vector (Tx, Tz), it is possible to determine what portion of the line segment comes in contact with the above-mentioned vertex. This makes it possible to find the portion AA where the cars 81, 82 make contact. This makes it possible to find the polygon at the impacted portion of the car when it crashed.

Next, processing to obtain the direction of impact, and the velocity of impact (impact energy) is executed (S703). This processing is done as follows. In FIG. 24, the velocity vector of car 81 is considered (Vx1, Vz1), the velocity vector of car 82 is considered (Vx2, Vz2), and the vector that joins the centers of car 81 and car 82 is considered a two-object vector (Sx, Sz).

The car 81 velocity vector (Vx1, Vz1) and the car 82 velocity vector (Vx2, Vz2) are each resolved to a two-object vector. These two-object vectors can be found using the inner product of the velocity vector and the normalized vector of the two-object vector (S'x, S'z).

That is, it is possible to obtain the car 81 two-object velocity vector (Wx1, Wz1)=(Vx1, Vz1) ( (S'x, S'z)

Further, it is possible to obtain the car 82 two-object velocity vector (Wx2, Wz2) =(Vx2, Vz2) ( (S'x, S'z).

The difference between the thus-determined two-object velocity vector (Wx1, Wz1), two-object velocity vector (Wx2, Wz2) results in the transfer velocity vector at crash time, making it possible to achieve the direction of velocity and the size of velocity at impact.

In this way, it is possible to obtain the direction of velocity and the size of velocity at impact (S703). On the basis of the data on the impact location obtained via the above-described processing (S702), and the data on the impact velocity direction and impact velocity obtained via this processing (S701 (S703)), interpolation processing is performed on the polygon data of this location of the car, which is read out from ROM 31 areas 311, 312, respectively (S704).

The interpolation processing method is considered to be interpolation using either a primary expression or a secondary expression. Interpolated polygon data is transferred to RAM in this way (S706). Polygon data transferred to RAM like this is called a RAM polygon. This RAM polygon is ultimately obtained via computation. That is, a screen of a damaged state can be realistically reproduced without readying large amounts of damaged polygon data in memory.

To render the damage to the impacted portion, texture mapping of ordinary undamaged texture and damaged texture is performed on the polygons comprising the car, and controlling the transparency parameters of both textures in accordance with the state of damage to the impacted portion (S705) makes it possible to render damage in accordance with the damage of the impacted portion of the car.

Figure 25:
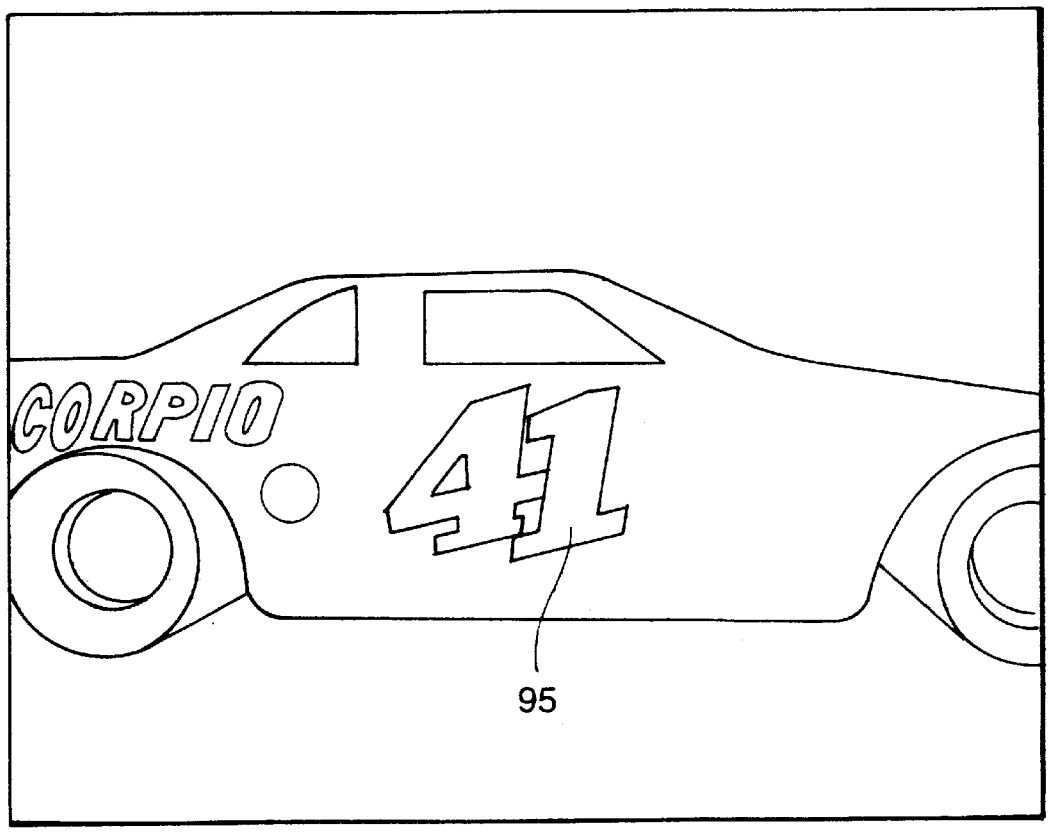
FIG. 25 is a diagram showing an example of a texture screen in the third embodiment.

That is, ordinarily, as shown in FIG. 25, display is performed so that only the former texture 95 appears, and the transparency parameter for the latter texture is set so that the transparency of the latter is high.

Figure 26:
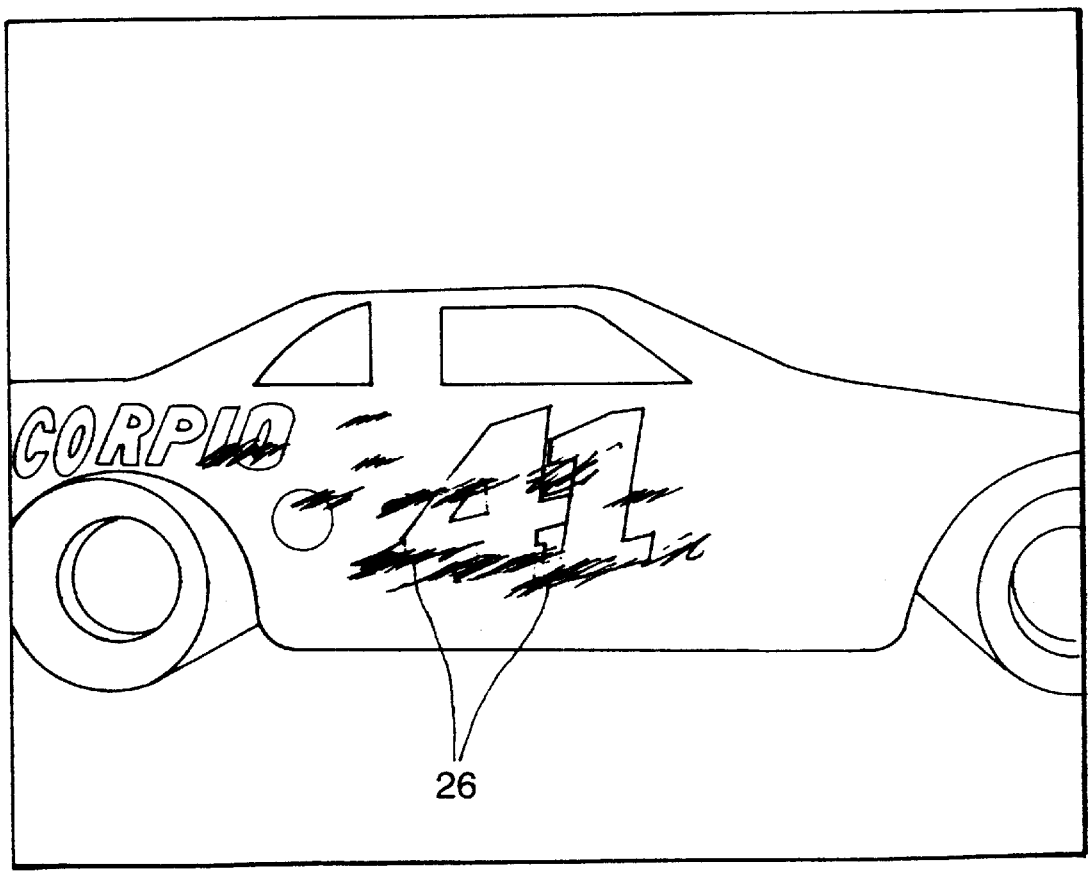
FIG. 26 is a diagram showing an example of a texture screen in the third embodiment.

Then, using the above-described computation results when there is a crash, transparency is lowered by controlling the transparency of the latter in accordance with the degree of the impact energy of the above-mentioned car, and, as shown in FIG. 26, damage 96 gradually emerges on the surface of the car as the impact energy increases.

In this way, in accordance with the above-described processing steps, it becomes possible to reproduce image processing, which generates damage in accordance with the direction of the impact of the car even when there is little damage (dents)

Since image processing is performed like this for this embodiment, a car's direction and energy quantity is reflected in the crash. That is, deformation resulting from a car crash is diversified, and the mode is accurately displayed by the direction of travel and impact of the car. Further, thanks to blocking, the computational load is limited.

As described above, in accordance with the present invention, image data that exceeds the capacity of a first storage means for rendering the movement of a movable object can be utilized, and images for rendering the movement of a movable object can be kept up-to-date at all times.

Furthermore, because it is possible to achieve a background screen, which conforms to the state of travel velocity of a movable object, it becomes possible to process images, which are natural and rich in expressive power.

And furthermore, the direction and energy quantity of a movable object is reflected in a crash, the deformation resulting from the crash of a movable object is diversified, and the mode is accurately displayed in the direction of travel and impact of the movable object. And thanks to blocking, the computational load is limited.

What is claimed is:

1. An image processing system displaying in a screen a moving state of a movable object, said image processing system comprising:
   a first storage means for dividing a storage area for providing to display means a screen of the moving state of the movable object moves into an area for a common display and an area for a movement display;
   a second storage means for storing data for rendering a screen of a state, in which a movable object moves, by dividing it in accordance with the divided state of said first storage means, and which stores information that indicates the relation between this divided storage data; and
   means for transferring to an area for movement display of the first storage means data, which is divided and stored in said second storage means on the basis of the relation between said divided storage data when a movable object moves.

2. The image processing system according to claim 1, wherein said first storage means is texture memory, and texture memory is utilized by being divided into a common area, wherein is stored texture data, which data is not re-written when displaying a state in which a movable object moves, and an even block area and an odd block area, which are capable of storing both blocks when texture pursuant to the movement of a background of a movable object is divided into an even block and an odd block, respectively.

3. The image processing system according to claim 2, wherein said second storage means stores in one block each the common texture and texture of each block in a state which conforms to the divided state of texture memory.

4. The image processing system according to claim 3, wherein one block of said second storage means stores a plurality of sheets of texture, and said transfer means is designed so as to transfer one sheet of texture from among the plurality of sheets of texture stored in this one block for every one frame processed.

5. An image processing system displaying in a screen a moving state of a movable object, said image processing system comprising:
   means for providing a plurality of textures, including:
      providing at least one first texture of a background image, in which the movable object is either in a stationary or low-speed state of travel,
      providing at least one second texture of a background image when the movable object is in a low-speed or higher state of travel; and
   means for mapping to the screen according to the state of travel of the movable object the second texture in addition to the first texture.

6. An image processing system displaying in a screen a moving state of a movable object, said image processing system comprising:
   means for preparing a plurality of textures;
   means for providing to at least one first texture thereof a background image, in which a movable object is either in a stationary or low-speed state, wherein said first texture is a picture, which is capable of displaying a screen of a road surface when a movable object is in a practically stationary state;
   means for providing to at least one of a remaining second texture a background image of when a movable object is in a low-speed or faster state of travel, wherein said second picture is a picture, which is capable of displaying a screen, in which a road surface is moving when a movable object is in a traveling state; and
   means for mapping to a screen according to the state of the movable object the second texture in addition to the first texture.

7. The image processing system according to claim 5, wherein said second texture is a picture, which is capable of displaying according to a traveling state of the movable object an effect screen for the traveling state thereof.

8. An image processing system, which displays in a screen a state, in which a movable object moves, this image processing system being characterized in that it comprises:
   processing means for computing a characteristic value for a state, in which a movable object interferes with another displayed object, and for reflecting this computed valuein the deformation quantity of said movable object.

9. The image processing system according to claim 8, wherein said interference state is a state in which a movable object has collided with another displayed object, and said processing means computes a characteristic value of the direction at the time of impact and the impact energy thereof.

10. The image processing system according to claim 8 or claim 9, wherein said movable object is divided into a plurality of blocks, and a block targeted for said image processing is determined from said computational value.

11. The image processing system according to claim 10, wherein the changing of a polygon shape of a targeted block before and after image processing is interpolated on the basis of said computed quantity from pre-deformation polygon data and post-deformation polygon data.

12. The image processing system according to claim 11, wherein polygon data of a targeted block of said movable object is interpolated from pre-crash polygon data and post-crash polygon data.

13. The image processing system according to claim 8, wherein a pre-deformation texture and a post-deformation texture are allocated to said movable object, and the blend ratio of both said textures is changed according to a detected quantity at the time of said crash.

14. The image processing system according to claim 13, wherein said blend ratio changes the transparency parameter of said texture.

15. An image processing system, which maps a prescribed texture to a displayed object, this image processing system comprising:

storage means, which stores a first texture, which reflects the results of image processing to be done on said displayed object, and which stores a second texture of before this image processing; and processing means, for mapping these textures to a displayed target on the basis of a prescribed blend ratio.

16. The image processing system according to claim 15, wherein said image processing computes a characteristic value for a state, in which a movable object, as a displayed object, interferes with another displayed object, and reflects this computed value in a deformation of said movable object.

17. A game machine, wherein a car race game is developed according to the image processing system of claim 1.

18. A storage medium for a game machine, in which the image processing system according to claim 1 is stored.

19. The game machine according to claim 17, wherein said traveling state is the velocity of said movable object, and said effect screen is a screen, which possesses a sense of speed according to this velocity.

20. A game machine, wherein a car race game is developed according to the image processing system of claim 5.

21. A game machine, wherein a car race game is developed according to the image processing system of claim 8.

22. A game machine, wherein a car race game is developed according to the image processing system of claim 15.

23. A storage medium for a game machine, in which the image processing system according to claim 5 is stored.

24. A storage medium for a game machine, in which the image processing system according to claim 8 is stored.

25. A storage medium for a game machine, in which the image processing system according to claim 15 is stored.

* * * * *

UNITED STATES PATENT AND TRADEMARK OFFICE
CERTIFICATE OF CORRECTION

PATENT NO. : 6,417,854 B1
DATED : July 9, 2002
INVENTOR(S) : Takashi Isowaki et al.

It is certified that error appears in the above-identified patent and that said Letters Patent is hereby corrected as shown below:

<u>Title page,</u>
Item [57], ABSTRACT,
Line 8, "themovable" should read -- the movable --.

<u>Column 16,</u>
Line 50, "valuein" should read -- value in --.

Signed and Sealed this

Fifteenth Day of July, 2003

JAMES E. ROGAN
*Director of the United States Patent and Trademark Office*